INVENTOR.
EUGENE H. IRASEK
BY Lulwider, Patton, Rieber, Lee, and Utecht
ATTORNEYS INVENTOR.
EUGENE H. IRASEK
BY Fulwider, Patton, Rieber, Lee, and Utecht
ATTORNEYS INVENTOR.
EUGENE H. IRASEK
BY Fulwider, Patton, Rieber
Lee, and Utecht
ATTORNEYS April 11, 1967 E. H. IRASEK 3,313,055

RANDOM ACCESS STORAGE AND RETRIEVAL DEVICE

Filed June 29, 1964 19 Sheets-Sheet 4

INVENTOR.
EUGENE H. IRASEK
BY Zulwider, Patton, Rieber
Lee, and Utecht
ATTORNEYS

RANDOM ACCESS STORAGE AND RETRIEVAL DEVICE

Filed June 29, 1964

INVENTOR.
EUGENE H. IRASEK
BY Zulwider, Patton, Rieber
Lee, and Utecht
ATTORNEYS INVENTOR.
EUGENE H. IRASEK
BY Fulwider, Patton, Rieber Lee, and Utecht
ATTORNEYS INVENTOR.
EUGENE H. IRASEK
BY Zulwider, Patton, Rieber
Lee, and Utecht
ATTORNEYS

RANDOM ACCESS STORAGE AND RETRIEVAL DEVICE

Filed June 29, 1964 19 Sheets-Sheet 8

INVENTOR.
EUGENE H. IRASEK
BY Zulwider, Patton, Rieber, Lee, and Utecht

ATTORNEYS

INVENTOR.
EUGENE H. IRASEK
BY Zulwider, Patton, Rieber, Lee, and Utecht
ATTORNEYS INVENTOR.
EUGENE H. IRASEK
BY Fulwider, Patton, Rieber, Lee, and Utecht
ATTORNEYS April 11, 1967 E. H. IRASEK 3,313,055

RANDOM ACCESS STORAGE AND RETRIEVAL DEVICE

Filed June 29, 1964 19 Sheets-Sheet 11

INVENTOR.
EUGENE H. IRASEK
BY Zulwider, Patton, Rieber, Lee, and Utecht
ATTORNEYS April 11, 1967 E. H. IRASEK 3,313,055

RANDOM ACCESS STORAGE AND RETRIEVAL DEVICE

Filed June 29, 1964 19 Sheets-Sheet 12

INVENTOR.
EUGENE H. IRASEK
BY Fulwider, Patton, Rieber, Lee, and Utecht
ATTORNEYS INVENTOR.
EUGENE H. IRASEK
BY Fulwider, Patton, Rieber Lee, and Utecht
ATTORNEYS

RANDOM ACCESS STORAGE AND RETRIEVAL DEVICE

Filed June 29, 1964 19 Sheets-Sheet 14

INVENTOR.
EUGENE H. IRASEK
BY Fulwider, Patton, Rieber Lee, and Utecht
ATTORNEYS INVENTOR.
EUGENE H. IRASEK
BY Fulwider, Patton, Rieber, Lee, and Utecht
ATTORNEYS INVENTOR.
EUGENE H. IRASEK
BY Fulwider, Patton, Rieber, Lee, and Utecht
ATTORNEYS April 11, 1967 E. H. IRASEK 3,313,055

RANDOM ACCESS STORAGE AND RETRIEVAL DEVICE

Filed June 29, 1964 19 Sheets-Sheet 17

INVENTOR.
EUGENE H. IRASEK
BY Fulwider, Patton, Rieber, Lee, and Utecht
ATTORNEYS INVENTOR.
EUGENE H. IRASEK
BY Fulwider Patton, Rieber, Lee, and Utecht
ATTORNEYS

RANDOM ACCESS STORAGE AND RETRIEVAL DEVICE

INVENTOR.
EUGENE H. IRASEK
BY Fulwider, Patton, Rieber, Lee, and Utecht
ATTORNEYS United States Patent Office 3,313,055

Patented Apr. 11, 1967

3,313,055
RANDOM ACCESS STORAGE AND RETRIEVAL DEVICE

Eugene H. Irasek, Garden Grove, Calif., assignor to Houston Fearless Corporation, Los Angeles, Calif., a corporation of California Filed June 29, 1964, Ser. No. 378,681
40 Claims. (Cl. 40—36)

The present invention relates to a random access storage, retrieval and delivery device in which large numbers of items are stored for recall of any one of the items into a delivery position upon command. The items are recalled individually and independently of other items and in any desired order as they are individually addressed.

Storage of items in devices according to the present invention may be in random positions, the items themselves being provided with identification means which permits them to be addressed and recalled as desired, independently of their positions or the order in which they are stored. In such an embodiment the items need not be placed in any particular position in the store, either when initially filed or when returned to the store after recall into a delivery position. Thus, all of a group of items may be enfiled in the store at the same point and stored in random order, with the individual items individually addressed for retrieval and recall.

With individual item identification, the position of the item in a group becomes immaterial and the items in the group may be stored in random order and may be individually addressed independently of their location which, in fact, is not identified except with respect to the group or magazine in which the items are stored. While the group or magazine in which a particular item is stored must be identified, the order of the items within the magazine can be entirely random and the items within a given magazine are selected by their individual identifications rather than the physical positions in which they may be located.

The embodiments of the invention selected for specific illustration in the description herein relate to the storage of information in the form of film chips or visual slides whose content is projected upon a viewing screen. Any one of a large number of slides may be recalled upon command for delivery to an optical projector for projection of the slide information onto a viewing screen. It will be understood that the present invention is adaptable to the storage and recall or retrieval of many different types of items, such as ledger cards, magnetic cards, optical cards, punch cards, tapes, keys, etc., which it is desired to store and retrieve without regard to the stored position of the particular item in a series of such items. Such items are hereinafter, in the specification and claims, referred to generally as "holders" or "cards."

In the specific embodiments illustrated, the items to be stored, retrieved and delivered to a viewing station are embodied in holders for film chips, slides or cards in which the holders are uniquely identified by coded information thereon. In a preferred embodiment of the invention, the coding is by means of notches in a holder edge, which notches may be located according to any desired code, such as standard binary, binary coded decimal, Gray binary and like codes which permit each individual card to be addressed by its identifying code and retrieved from a random storage position.

The basic selector mechanism according to the present invention lends itself readily to use in a simple, lightweight, single magazine unit such as might be used for home viewing of photographic slides, or may equally as well be used in large library storage, both commercial and military, where literally millions of slides or film chip holders may be stored for recall with the same basic selector mechanism. Likewise, the invention may be readily adapted to utilization with a multiplicity of viewing stations which may be located either as local units or, with transmission lines, in remote positions.

The invention further contemplates the use of a "look-ahead" feature providing for selection of the next item desired to be recalled, while a prior item is in the delivery or projection station. This will reduce the access time to a plurality of scheduled items and reduce the delay time between successive projections.

The basic coding system and selection mechanism are thus of extensive versatility in that their use may vary from an inexpensive single group to the addressing of a multiplicity of magazines or groups for delivery to one or a plurality of viewing stations or delivery points. The selector mechanism may move in a single plane to enfile and retrieve the items; it may rotate to address different groups or stacks stored in a circular fashion; or it may traverse in a straight line where such a format is desirable. Multiple tier or level storage of the groups or stacks may also be employed with both circular and planar disposition.

While any number of items may be stacked in an individual magazine, a preferred magazine stack embodiment of the invention illustrated in the drawings supports 255 holder items in the magazine numbered from 1 through 255 decimal and 1 through 377 octal and identified by eight notches in the front edge of each holder, the notches being arranged according to standard binary code to provide one, and only one, combination for each holder in each magazine stack. The holders are selected by means of address bars with which they are relatively movable and which are positioned with respect to the notches in the same binary coding. The address bars each have two positions, one corresponding to a binary zero and the other to a binary one.

The address bars and the holders are moved relative to each other so that only a single holder will receive the address bars in the particular address position in which the bars are located, and "picker" bars automatically engage and grip the selected holder to withdraw it from the stack and move it into a delivery position. After use, the selected holder is returned to the stack at either the top or bottom thereof and its position relative to the other holders in the stack is therefore entirely random, in accordance with the random order in which the items are retrieved from the store. The operation of the picker bars in gripping a selected holder is desirably automatically effected as an incident to the movement of the picker bars into holder-engaging position. The release of the holder by the picker bars is likewise desirably automatically effected in delivering the selected holder to the viewing station.

One of the features of the present invention is the use of magnetic elements on the holders by which they are pulled into and held in an indexed longitudinal position with respect to stationary side magnets and which operate by their mutual magnetic repulsion to secure vertical fanning out of the holders in a stack to avoid excessive pressure and friction on the holders, particularly in the bottom of the stack, which could render their withdrawal difficult. To facilitate the return of the holders to the bottom of the stack, this fanning out is assisted by automatically elevating the holders in the bottom of the stack prior to the bottom return of each holder thereto.

It is therefore an object of the present invention to provide an improved random-access storage and retrieval device for a multiplicity of items.

Another object of this invention is the provision of an improved storage and retrieval device which is simple, inexpensive and reliable and which provides for retrieval of individual items from a large number stored in random positions.

Another object of this invention is the provision of an improved random-access storage and retrieval device whose basic selector mechanism is adaptable to both simple, inexpensive, small capacity home units, and to large library storage of a vast number of items.

A further object of this invention is the provision of an improved random access storage and retrieval device in which the stored holder items have front edge notches positioned to identify each holder uniquely and a selector mechanism employs address members positionable to uniquely select a desired holder and in which the address members and holders are moved bodily relative to each other to locate the address members within the identifying notches corresponding to their positions to select the desired and addressed holder.

A still further object of the invention is the provision of an improved random access storage and retrieval device in accordance with the immediately preceding object which employs means for automatically gripping the selected holder and withdrawing it from a stack of holders.

Another object of this invention is an improved store for a plurality of vertically stacked holders in which the holders have magnetic portions thereon disposed in alignment with side magnets to locate the holders longitudinally and to magnetize the portions for vertical repulsion between adjacent holders to lessen the friction therebetween.

Yet another object of this invention is the provision of an improved single or multiple level, multiple stack library store for a large number of holders, with identified positions for the stacks and randomly positioned holders in the stacks, and with the stacks optionally disposed in circular or planar format, and selector mechanism for the holders movable in accordance with the stack format.

These and other objects and features of this invention will be readily apparent to those skilled in the art from the following specification and the appended drawings, in which:

FIGURE 1 is a transverse vertical sectional view through an embodiment of this invention utilizing a single magazine stack of stored holders;

FIGURE 1*a* is a detail view of the picker-bar operating elements of the selector mechanism of FIGURE 1;

FIGURE 2 is a vertical sectional view taken just inside the right hand side wall of FIGURE 1 and at right angles to the section plane of FIGURE 1;

FIGURE 2*a* is a detailed sectional view on the line **2*a*—2*a*** of FIGURE 2;

Figure 18A:
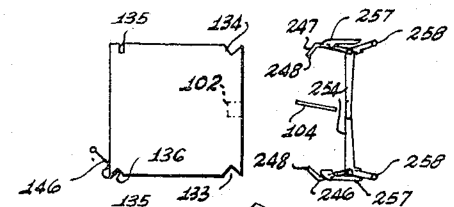
Figure 18B:
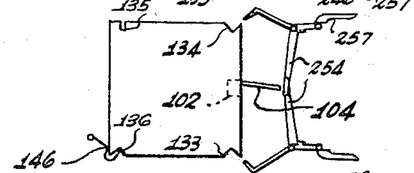
Figure 18C:
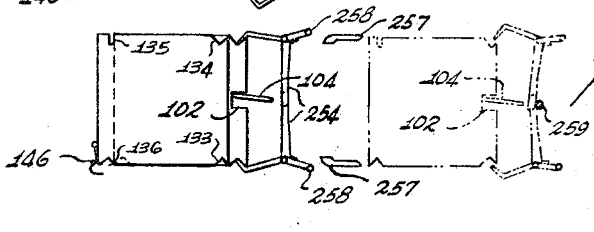
Figure 19:
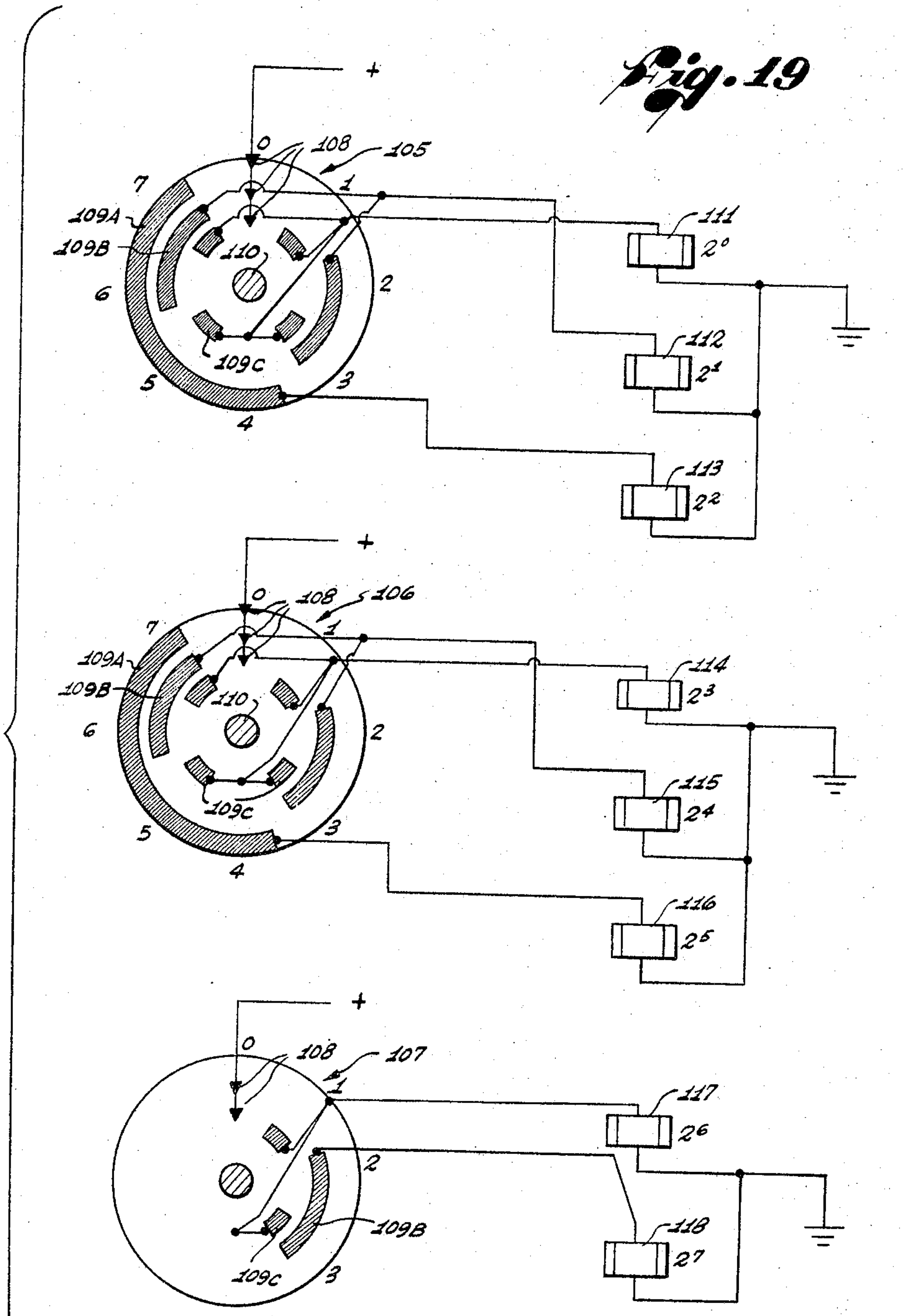
Figure 20:
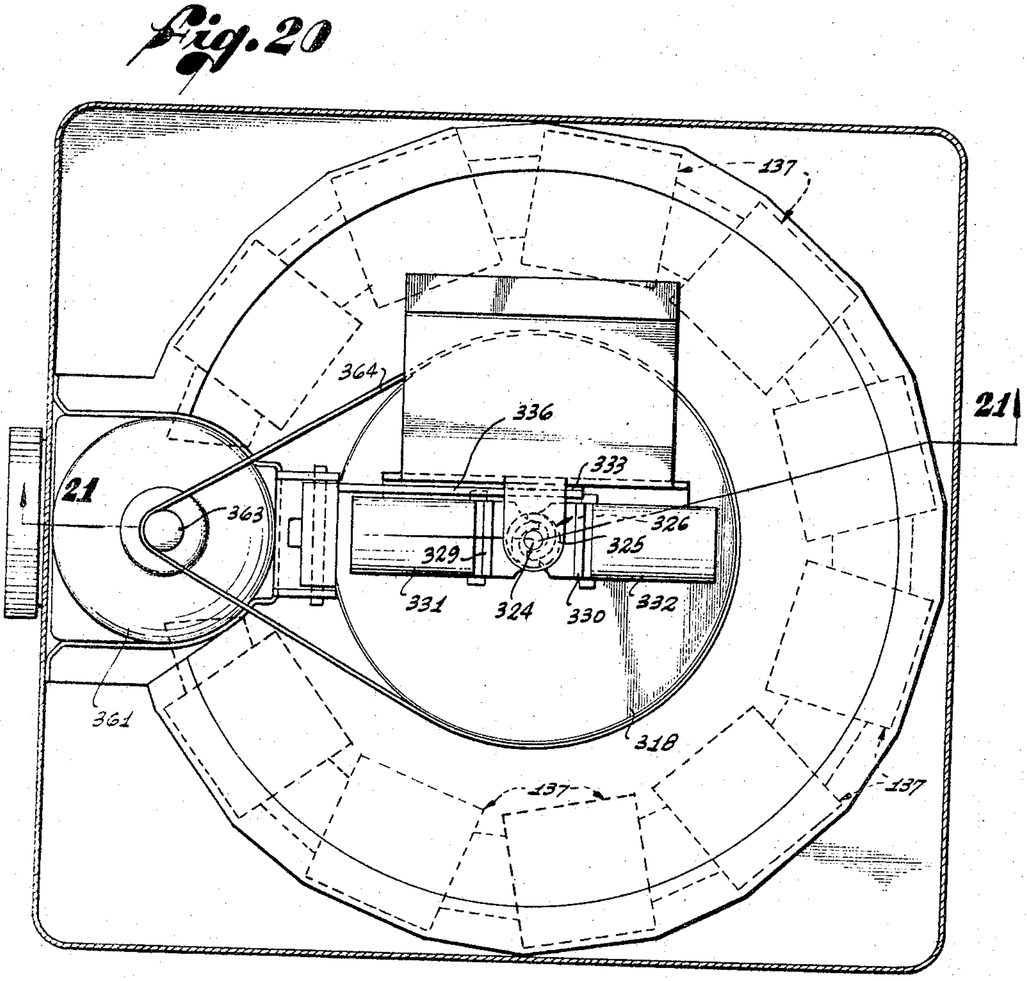
Figure 22:
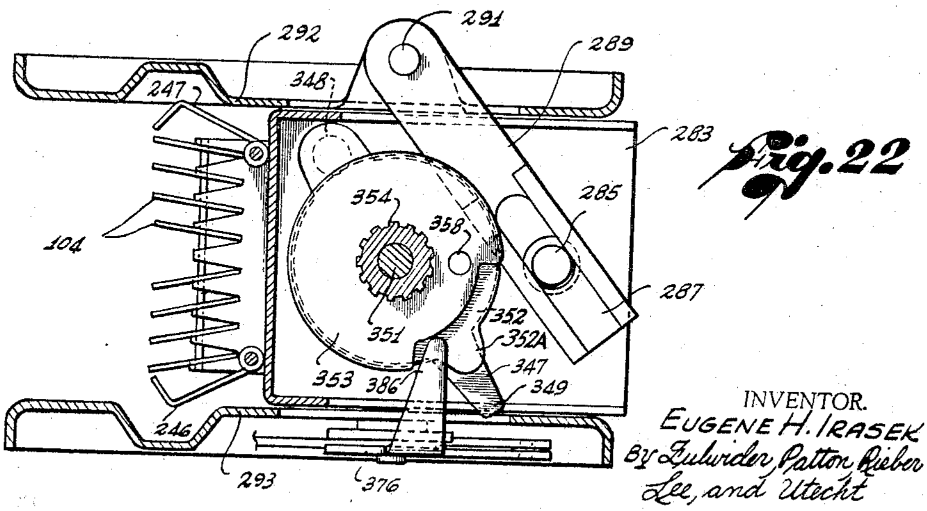
Figure 21:
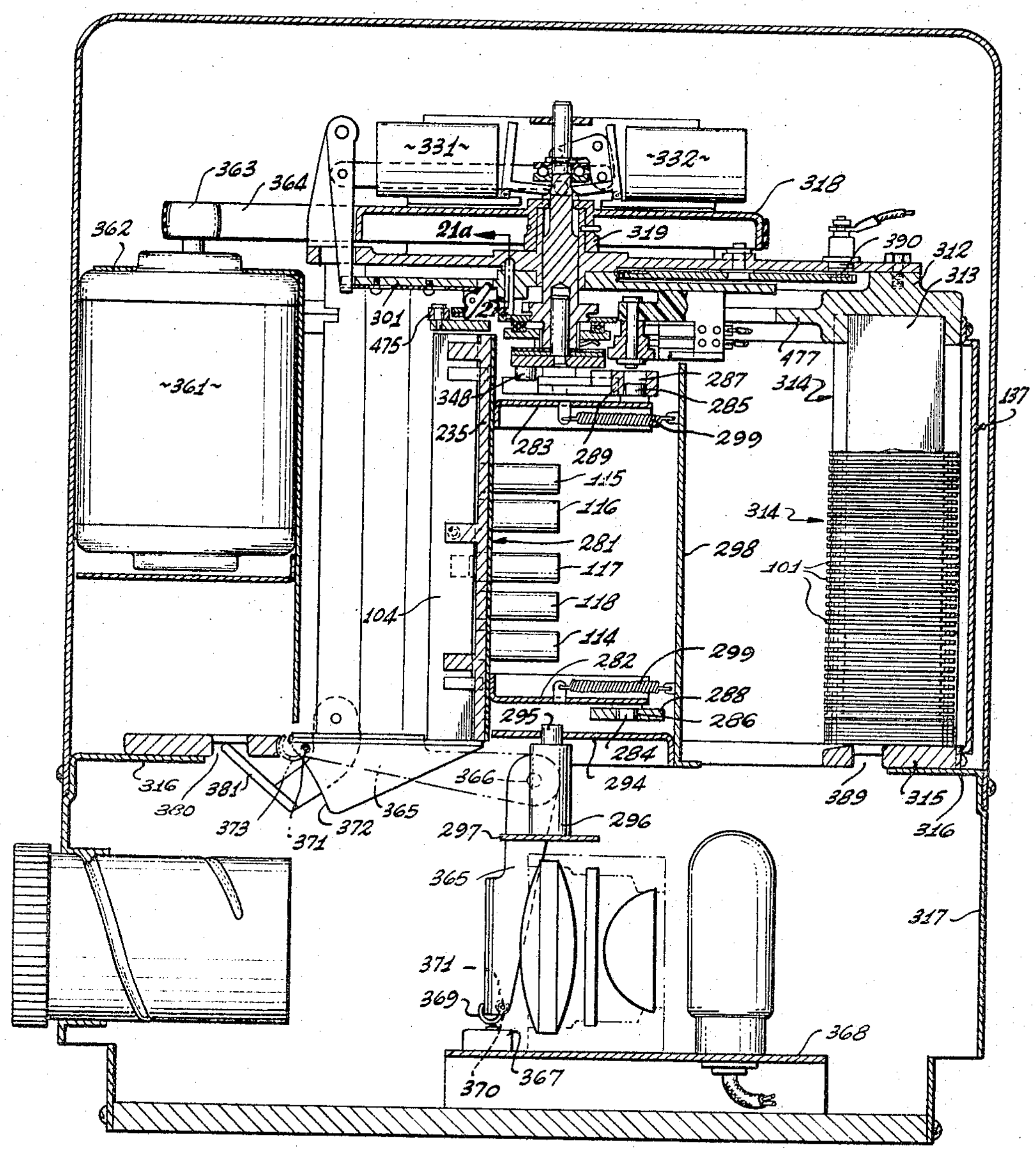
Figure 21A:
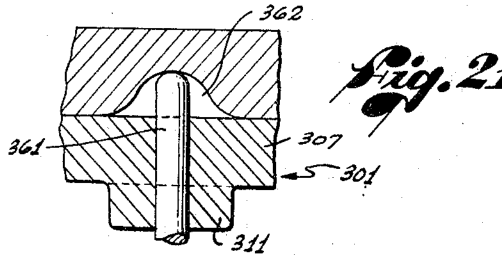
Figure 23:
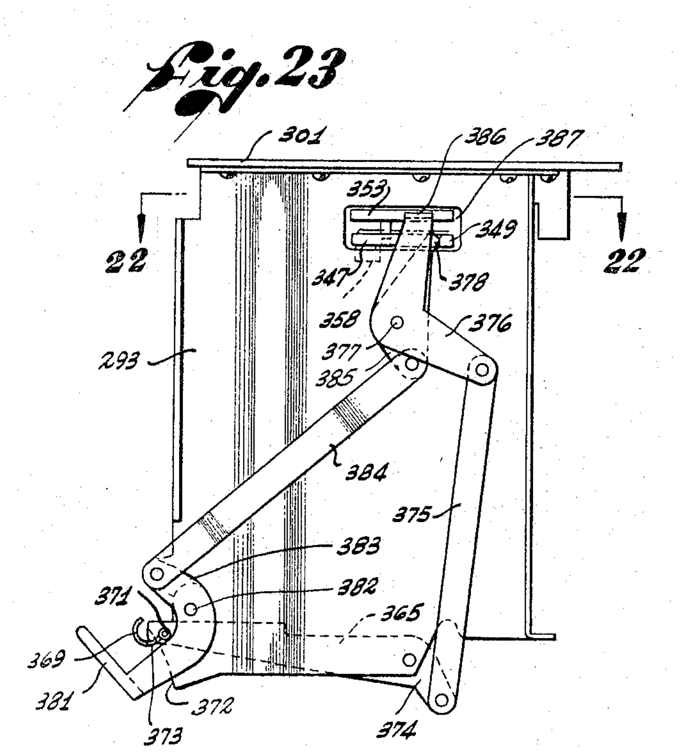
Figure 24:
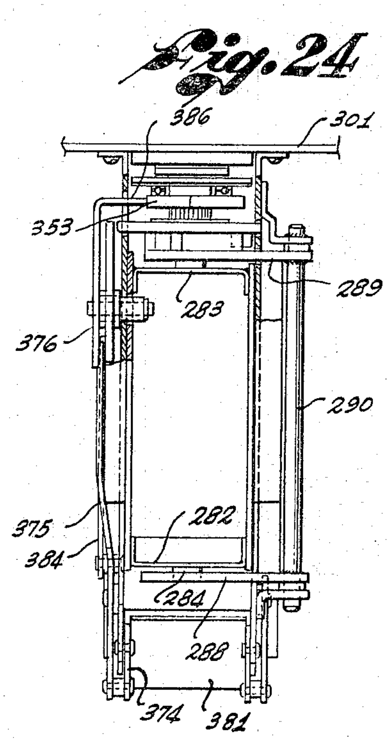
Figure 26:
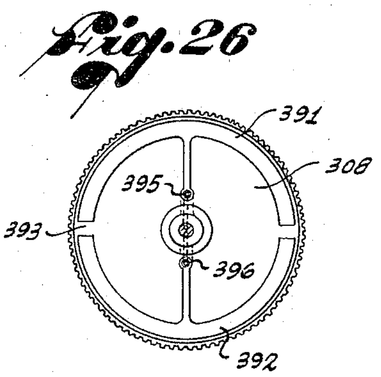
Figure 25:
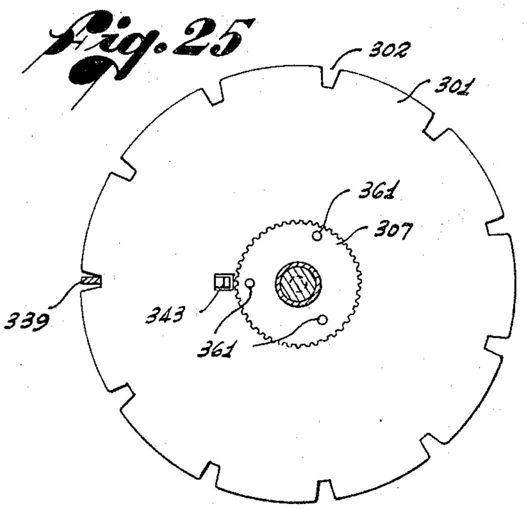
Figure 27:
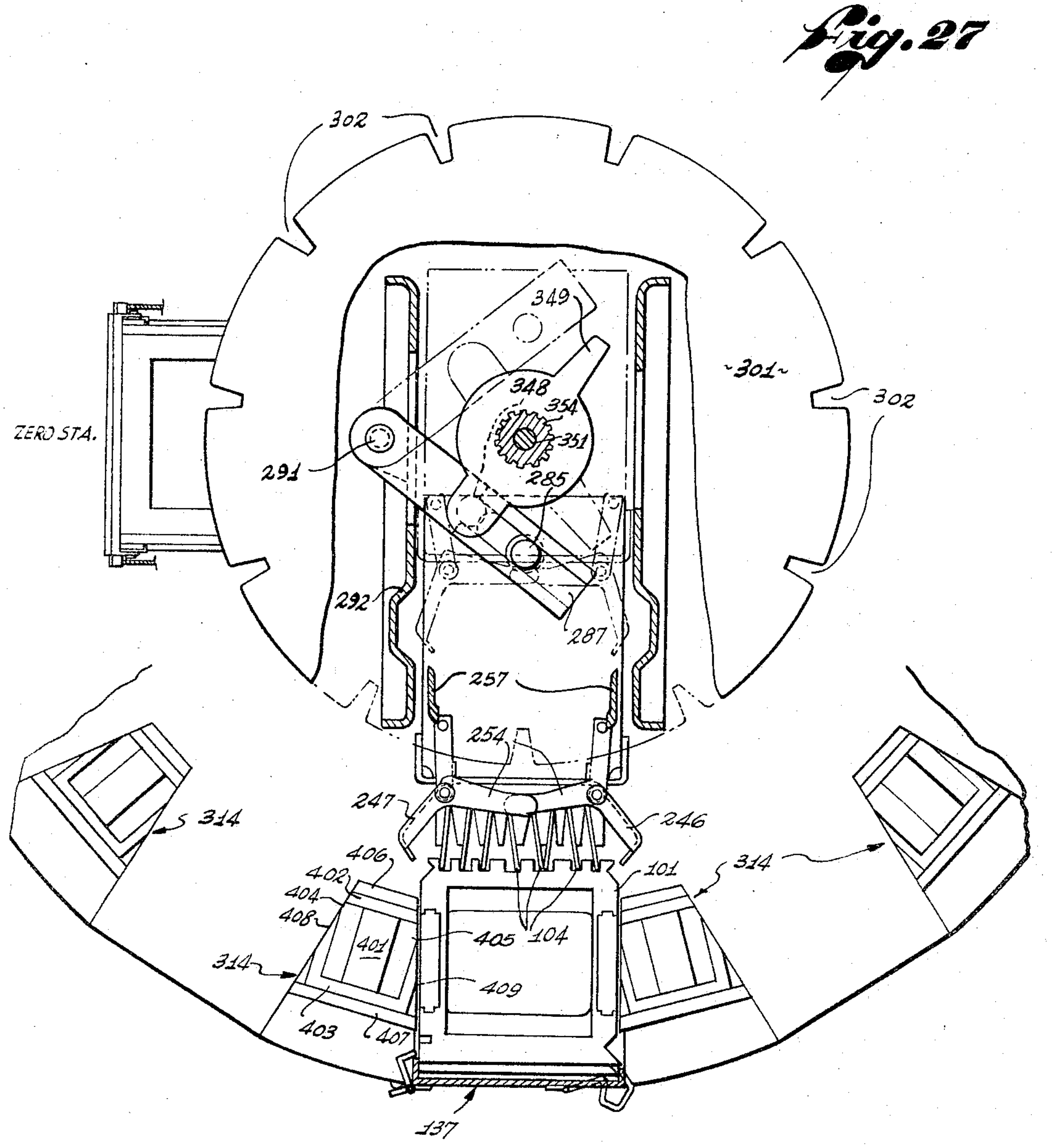
Figure 28:
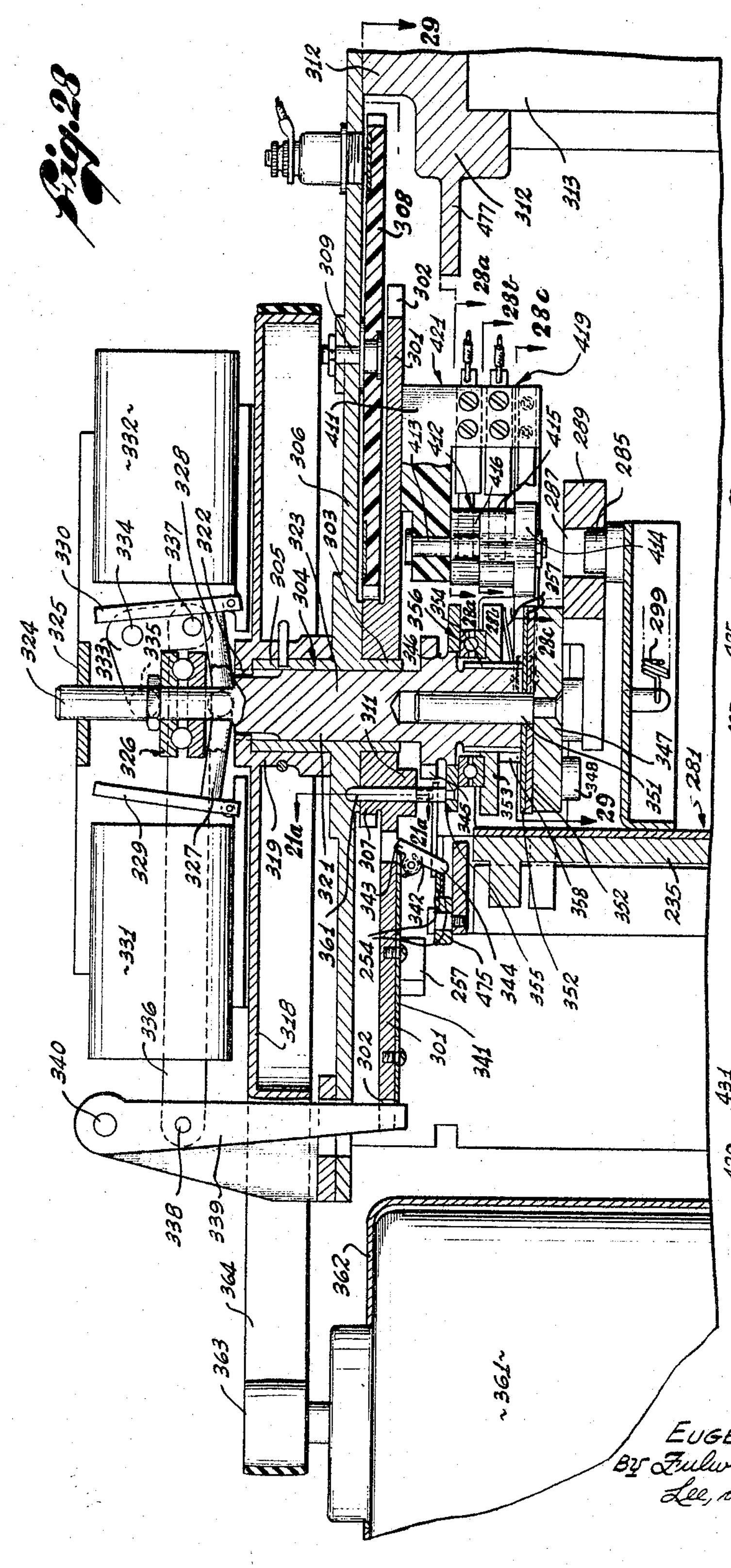
Figure 28C:
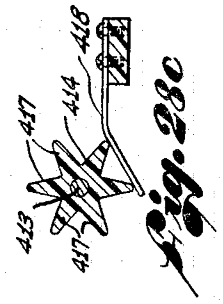
Figure 28B:
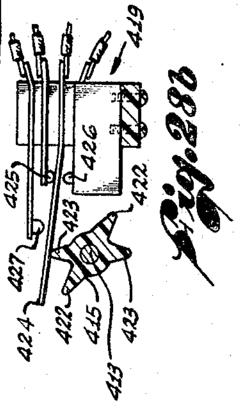
Figure 28A:
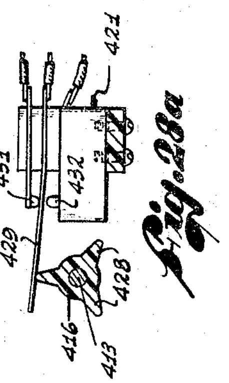
Figure 29:
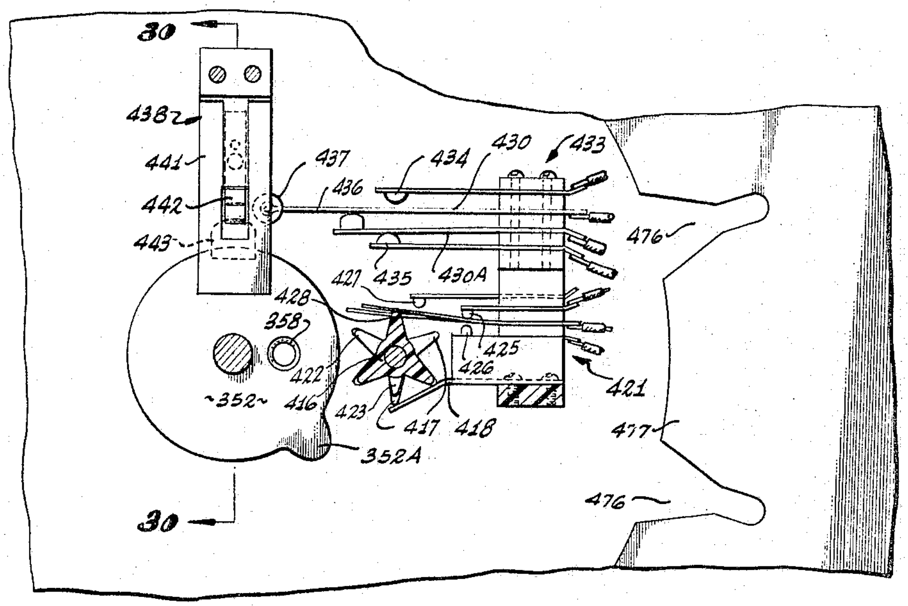
Figure 30:
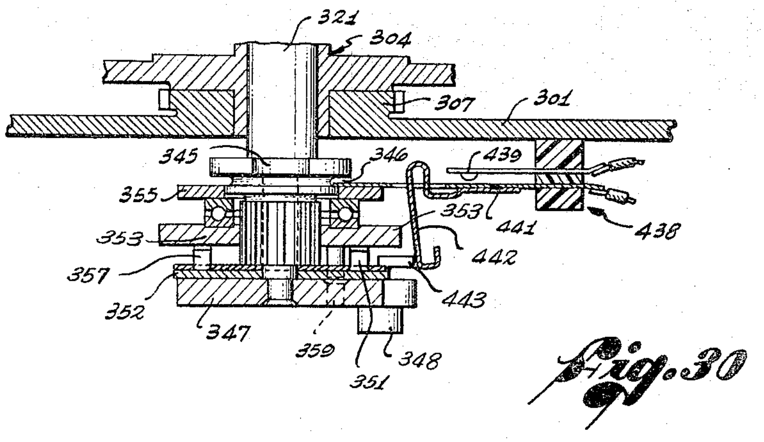
Figure 32:
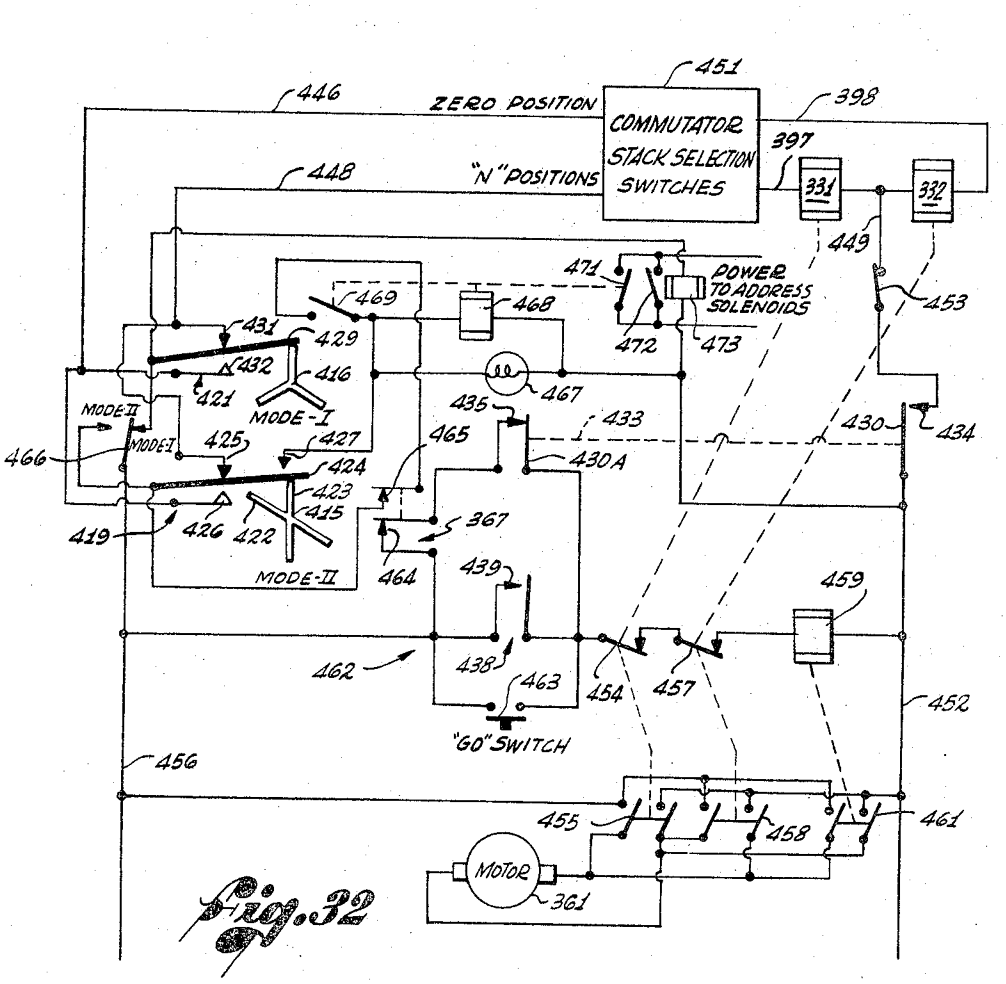
Figure 32A:
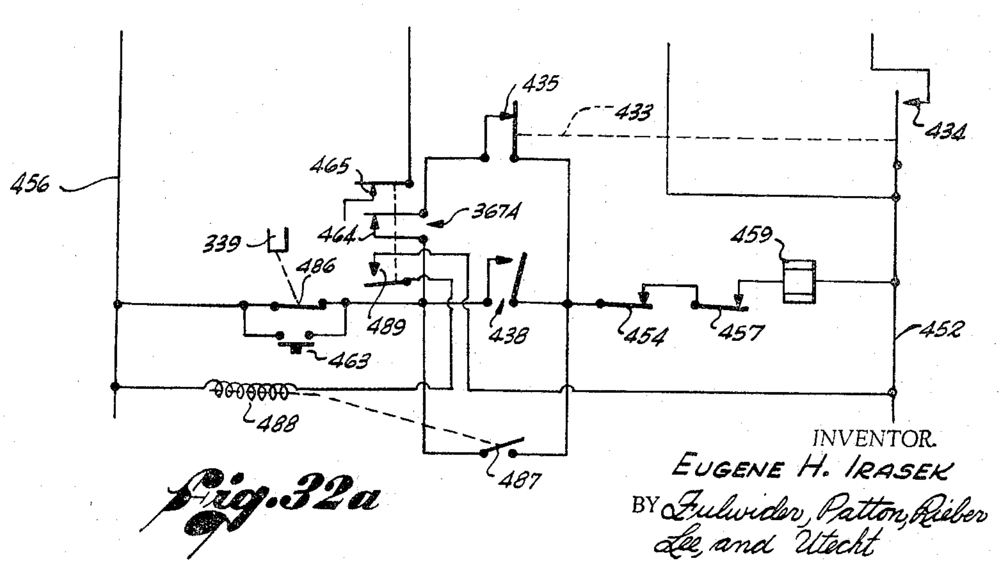
Figure 31:
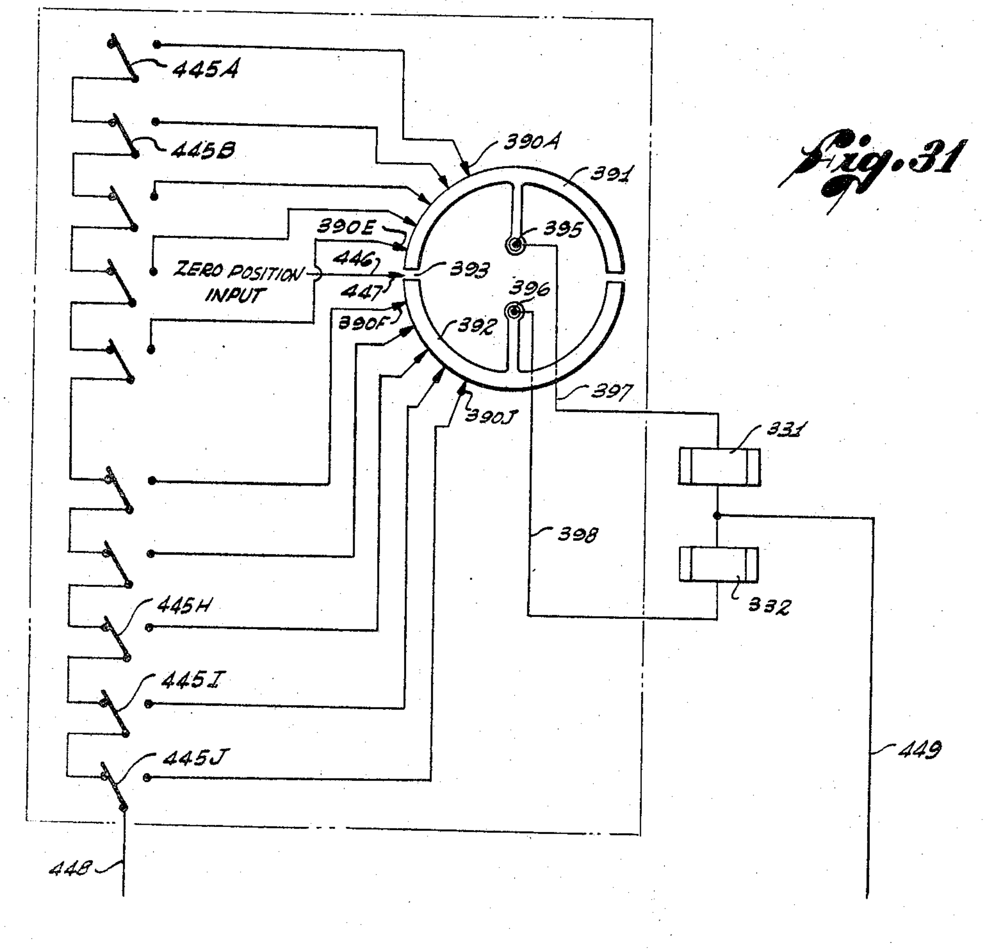
Figures 34, 35:
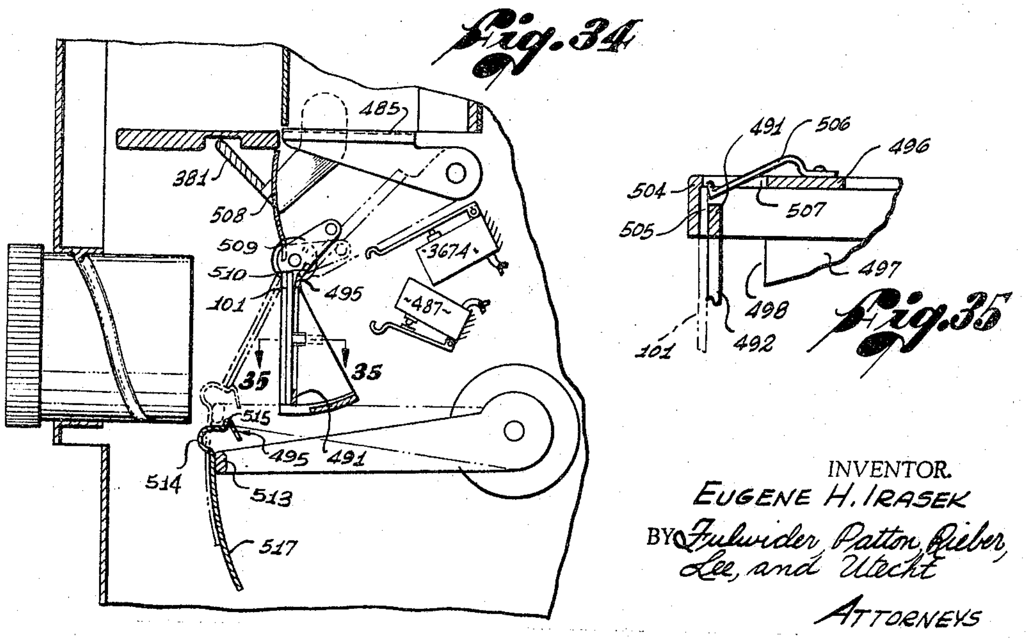
Figures 33, 36, 37:
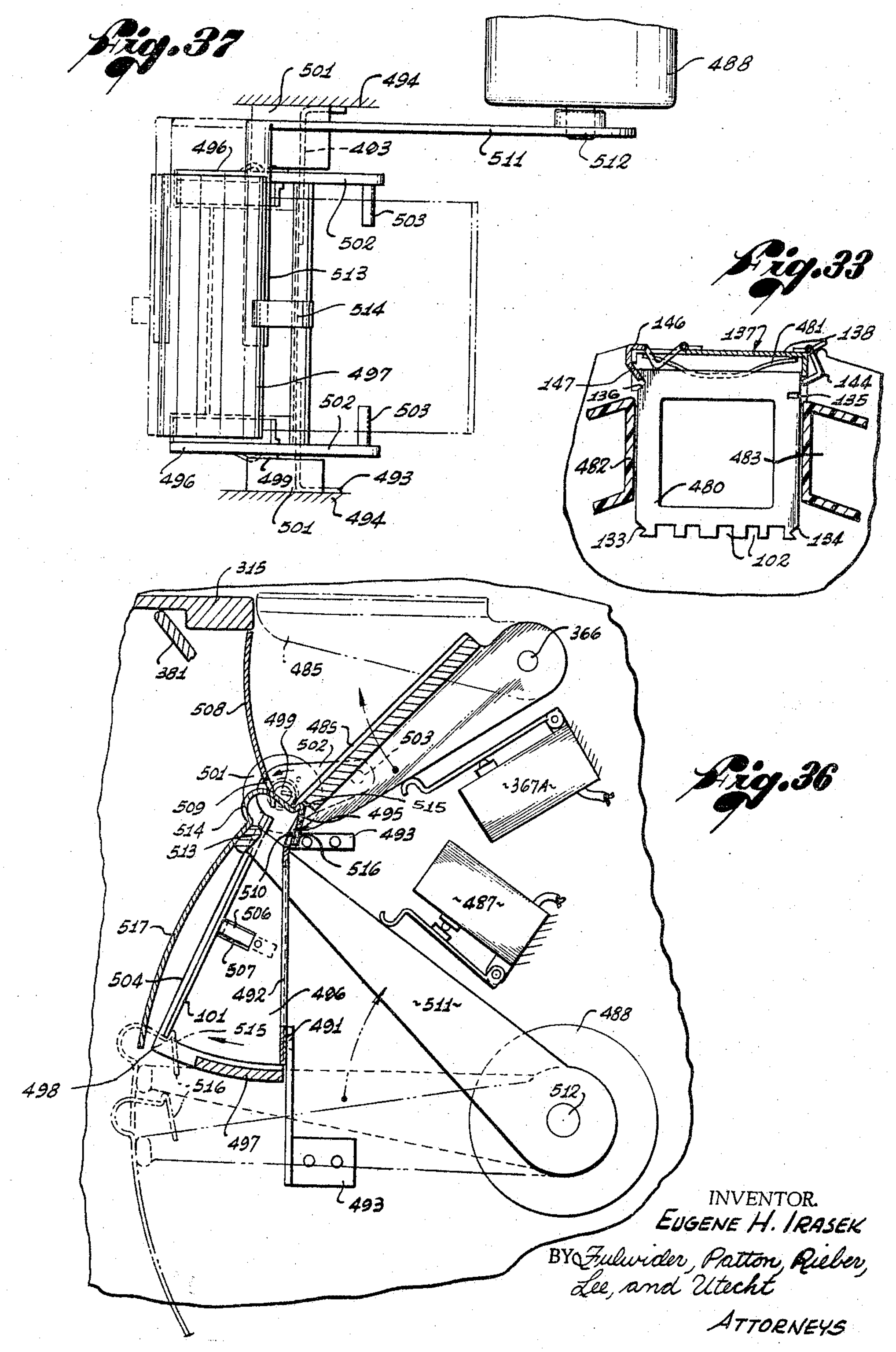
Figure 38:
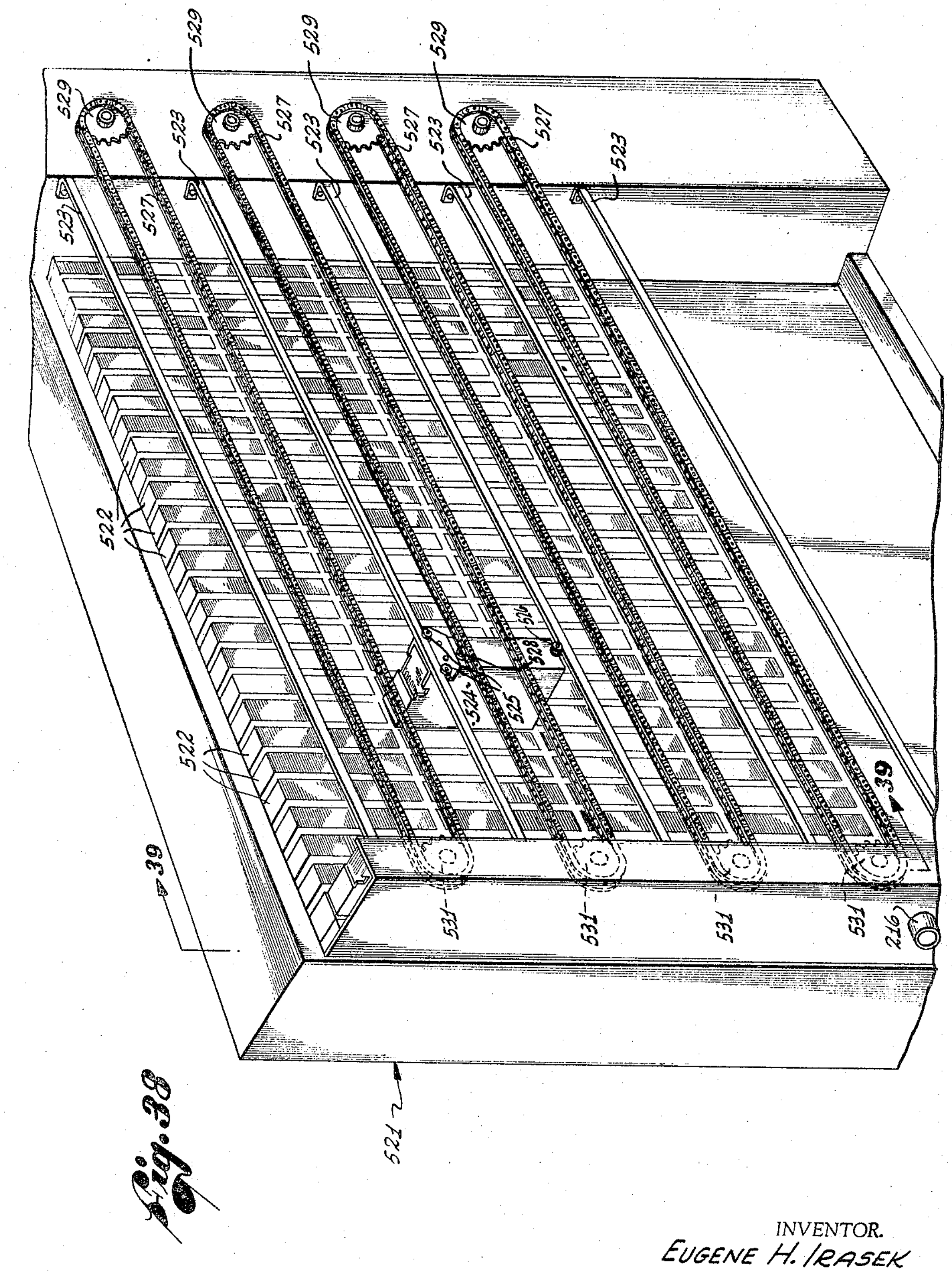
Figures 39, 39A:
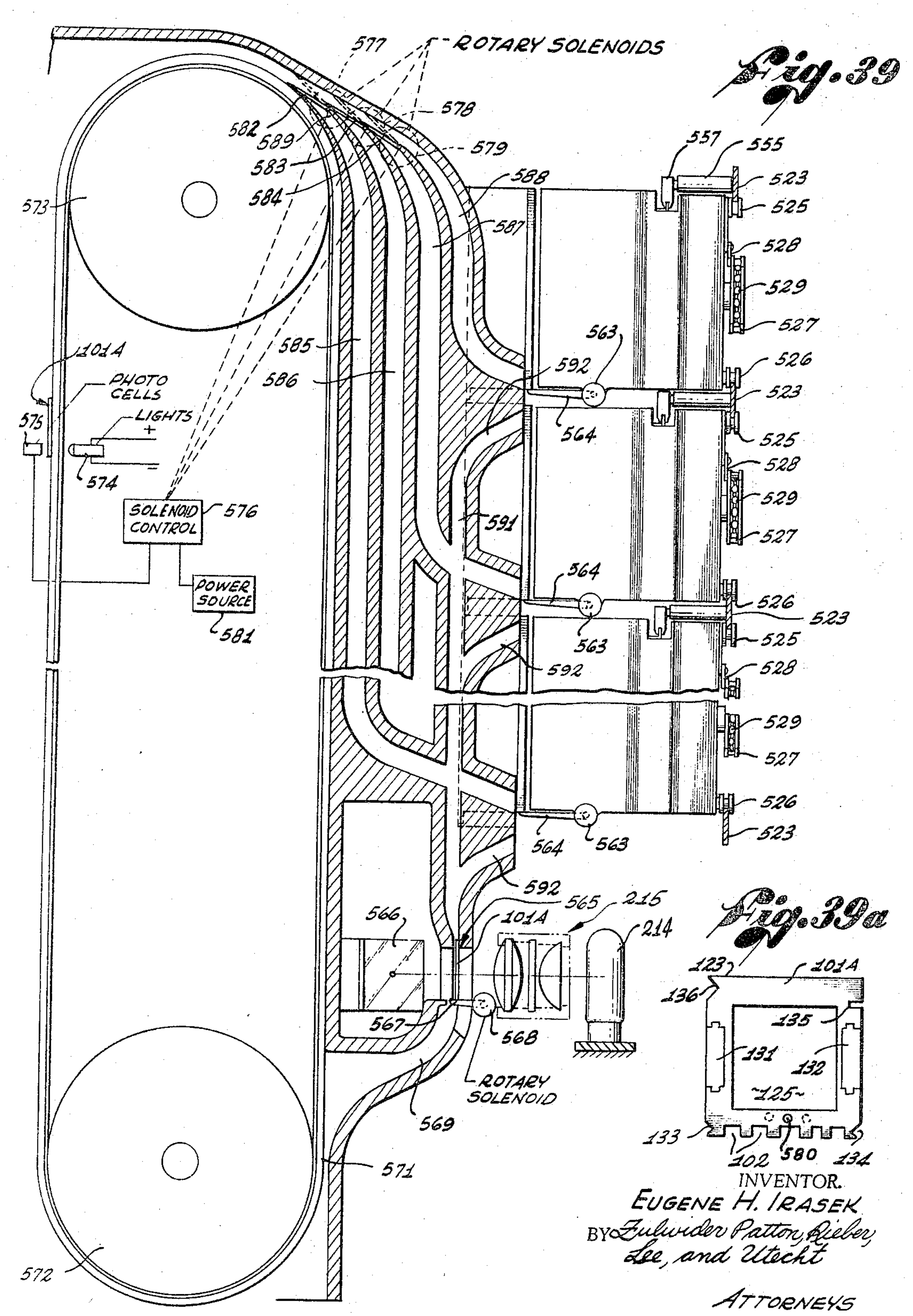
Figure 42:
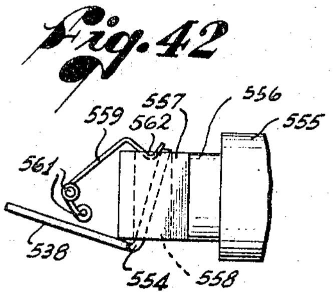
Figure 41:
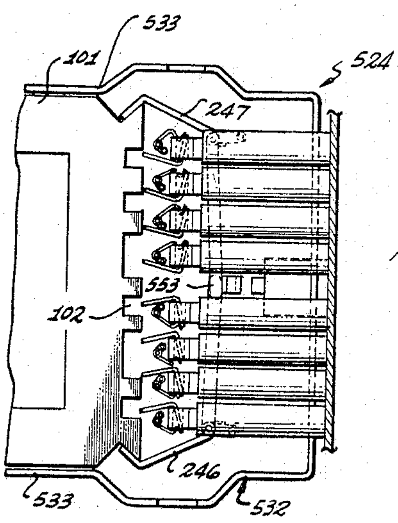
Figure 43:
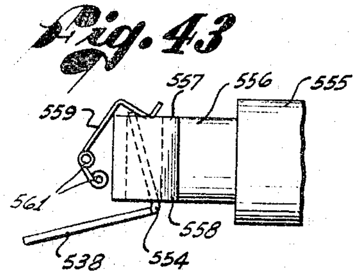
Figure 40:
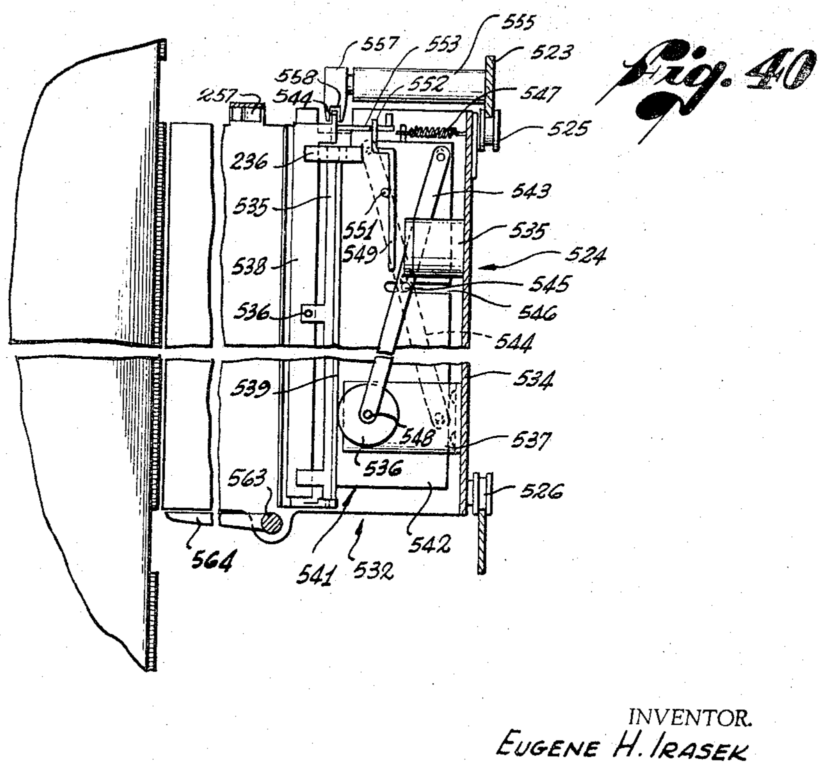

FIGURES 18*a*, 18*b* and 18*c* show successive steps in the engagement of the picker bars with a selected holder and, in phantom in FIGURE 18*c*, the release of the selected holder;

FIGURE 19 is a schematic representation of switches using octal radix identification to control solenoids which position the address bars in binary coding;

FIGURE 20 is a plan view, with the top cover removed, of an embodiment of the invention utilizing a plurality of holder stacks in circular format, with a single delivery or projection position;

FIGURE 21 is a vertical sectional view through the embodiment of FIGURE 20 taken primarily on the line 21—21 of FIGURE 20 and with parts offset for clarity;

FIGURE 21*a* is a detail sectional view on the line **21*a*—21*a*** of FIGURE 21;

FIGURE 22 is a horizontal sectional view on the line 22—22 of FIGURE 23;

FIGURE 23 is a side elevational view of the rotatable and translatable selector mechanism of this embodiment of the invention;

FIGURE 24 is an end elevational view of the selector mechanism of FIGURE 23;

FIGURE 25 is a horizontal sectional view taken just above the top of the selector mechanism of FIGURE 23;

FIGURE 26 is a detail plan view of the commutator wheel of this embodiment of the invention;

FIGURE 27 is a partial horizontal sectional view of the embodiment of FIGURE 20 showing various operational elements and the side magnet structure for the holder stacks;

FIGURE 28 is an enlarged view of the upper portion of FIGURE 21;

FIGURE 28*a* is a detail sectional view on the line **28*a*—28*a*** of FIGURE 28;

FIGURE 28*b* is a detail sectional view on the line **28*b*—28*b*** of FIGURE 28;

FIGURE 28*c* is a detail sectional view on the line **28*c*—28*c*** of FIGURE 28;

FIGURE 29 is a partial horizontal sectional view on the line 29—29 of FIGURE 28;

FIGURE 30 is a vertical sectional view on the line 30—30 of FIGURE 29;

FIGURE 31 is a diagrammatic representation of the commutator and a magazine selecting switching arrangement;

FIGURE 32 is a complete wiring diagram for the rotary, multi-magazine embodiment of the invention;

FIGURE 32*a* is a partial wiring diagram showing the modifications of FIGURE 32 to include a look-ahead feature in the device;

FIGURE 33 is a partial horizontal sectional view of a modified holder and stack mounting arrangement;

FIGURE 34 is a partial elevational view of an embodiment of the invention employing a look-ahead feature;

FIGURE 35 is a detail sectional view on line 35—35 of FIGURE 34;

FIGURE 36 is an enlarged elevational view similar to FIGURE 34, but with the parts in a different operating position;

FIGURE 37 is a plan view of the mechanism of FIGURE 36;

FIGURE 38 is a perspective view of a multiple tier, planar magazine format embodiment of the present invention;

FIGURE 39 is a vertical sectional view on line 39—39 of FIGURE 38 through the "0" or delivery position of the embodiment of FIGURE 38;

FIGURE 39*a* is a plan view of a modified form of holder with additional, optical identifying means;

FIGURE 40 is a vertical sectional view through one of the rectilinearly shiftable selector mechanisms of FIGURE 38;

FIGURE 41 is a plan view of the mechanism of FIGURE 40;

FIGURE 42 is a detail view showing an address bar of the selector mechanism of FIGURE 40 in a binary zero position;

FIGURE 43 is a view similar to FIGURE 42 but with the address bar shown in binary one position.

*Identification coding*

Figure 17:
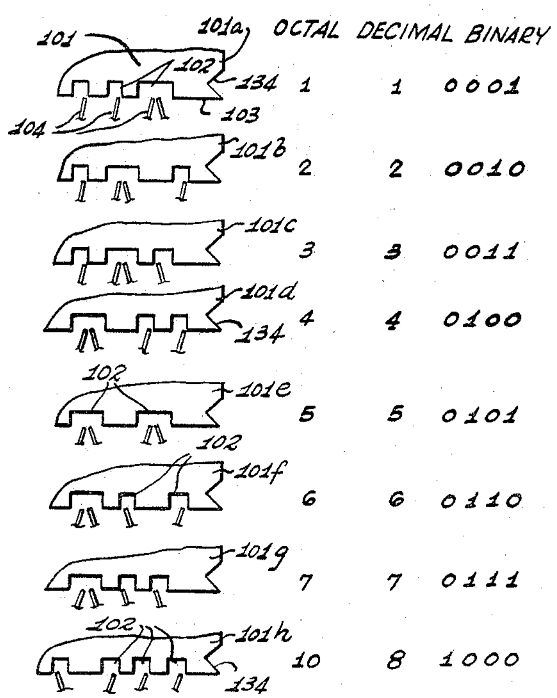
FIGURE 17 is a diagrammatic representation of the binary coding of the front edge notches in the holders and the cooperation of the address bars therewith.

The coding and addressing of the holder items is diagrammatically illustrated in FIGURE 17 where the four least significant coding notches and address bars are illustrated in various positions to identify holders or cards numbered from 1 through 8 in the decimal radix. The coding notches are illustrated as disposed in an edge of a holder for a film chip or card, but it will be understood that they may be placed directly in a card itself, in an auxiliary holder in which the chip holder is placed, or may be disposed in a separate identifying strip or tag which may be attached to the film chip or card or its holder.

The terms "holders" or "cards" used in this specification and in the claims are intended to be construed generically to cover all of the many different forms which stored items may take in which they may be individually identifiable by coding arrangements. It will further be understood that any desired coding arrangement may be used, with identification in any radix, and that the binary radix may be in standard binary, binary coded decimal, binary Gray code, or any other coding arrangement which may be selected for a particular embodiment.

Referring now in more detail to FIGURE 17, the holders or cards 101 are provided with a plurality of coding notches 102 therein at a front edge 103. Facing the edge 103 are a plurality of address bars 104 which are illustrated to have right and left-hand positions corresponding to binary values of zero and one, respectively. The various holders 101 shown in FIGURE 17 have the address bars 104 positioned relative thereto to select and uniquely identify each individual holder with which they are associated. Thus, holder 101*a* which is by decimal, octal, and binary one, has its edge notches 102 in binary 0001 positions and the address bars 104 shown with holder 101*a* are in like positions to select holder 101*a* by having the address bars 104 received within its slots 102. Similarly, holder 101*b* has its slots 102 arranged in binary positions 0010 to identify a particular holder No. 2 in both octal and decimal radix. The holders 101 continue in the figure to holder 101*i* which has its identifying slots 102 arranged in binary 1000 to correspond to decimal 8 and octal 10.

The use of the octal designation of the holders permits a very simple addressing arrangement shown diagrammatically in FIGURE 19 as including three rotary switches 105, 106 and 107 of ascending significance by the solenoid and address bar positions which they control. Thus, addressing switch 105 controls by its various positions the energization of solenoids 111, 112 and 113; addressing switch 106 controls the energization of solenoids 114, 115 and 116; and addressing switch 107 controls addressing solenoids 117 and 118. Each of the switches 105–107 has stationary contacts 108 connected to a power supply and arcuate rotary contacts connected to the addressing solenoids. Rotary contacts 109*a* are at an outer radius about the central shaft 110 about which the switches operate, contacts 109*b* rotate at an intermediate radius, and contacts 109*c* at an interior radius, all of the contacts 109*a*, 109*b* and 109*c* cooperating with the common contacts 108 when rotated into engagement therewith.

As will be explained hereinafter, in the detailed description of the single magazine embodiment of the invention, the solenoids 111–118 are positioned so that when energized each will shift its associated address bar 104 from its binary zero position to its binary one position. As illustrated, the four least significant bars 104 are in binary zero position to the right in FIGURE 17 when the solenoids are deenergized, and are rotated to the left to indicate a binary one when their respective solenoids are energized.

While, for purposes of illustration and description, a simple octal addressing arrangement in switches 105–107 has been illustrated, it will be understood that this may be readily adapted to initial decimal setting, with a conversion internally to octal to energize the solenoids in binary coding to set the address bar positions. In the simple arrangement illustrated, a code book could be kept for easy conversion from a decimal number, if the items are classified by decimal numbers, to their octal radix equivalent and the octal equivalent set on the switches 105–107.

The setting of the address bars 104 to the positions to select a card identified by an octal designation is quite simple as, for example, with an octal designation of 165 switch 105 is set to 5, switch 106 is set to 6 and switch 107 to 1, the settings being accomplished by rotating each switch until the identifying number is placed at its stationary contacts 108. In the example, the setting of switch 105 to 5 will energize solenoids 111 and 113, the setting of switch 106 to 6 will energize solenoids 115 and 116, and the setting of switch 107 to 1 will energize solenoid 117. This will result in a binary coding arrangement of the address bars 104 in the form 0111 0101 and the address bars will therefore select from the magazine stack the holder which is uniquely designated by octal 165 (decimal 117).

*The holder*

One form of holder which may be used as a stored item according to the present invention is illustrated in FIGURES 9 through 12 with the general designation 101. It comprises an outer sheet metal frame 122 returned on itself at the edge 123 to embrace a masking sheet 124 and a film chip 125 between the sheet metal walls. The upper frame wall is provided with a pocket 126 to accommodate the mask and chip with the upper and lower walls abutting, and the end of the lower wall is interlocked with the upper wall by means of fingers 127 extending through complementary slots in the upper wall. The central portions of both walls of the holder are cut out at 128 to expose the mask and chip therethrough. The front portion 129 of the holder 101 is provided with the coding notches 102 in its edge. The frame 122 is desirably formed of non-magnetic material, of which a readily formable and bendable sheet metal such as aluminum is an example, and has side inserts 131 and 132 of magnetic material, such as soft iron. These inserts are interlocked between the top and bottom walls of the frame 122, as illustrated more particularly in FIGURES 11 and 12, so as to be rigidly secured in the holder.

*The magazine*

Figure 15:
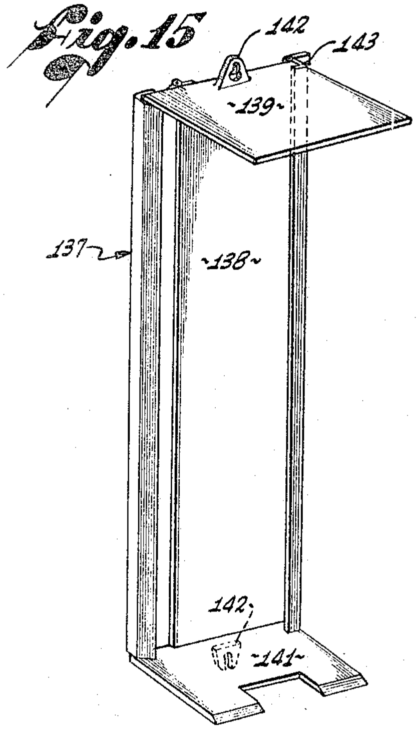
FIGURE 15 is a perspective view of a magazine for a plurality of stacked holders.
Figures 14, 16:
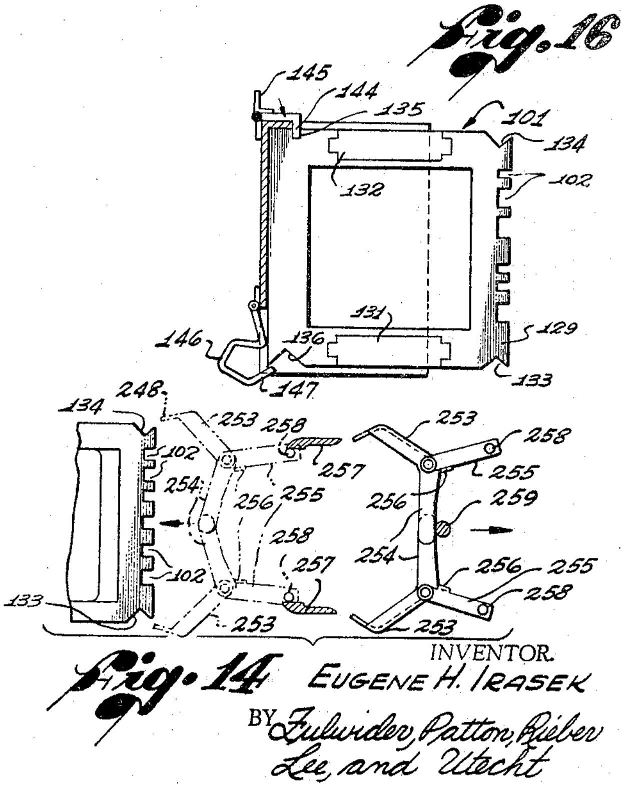
FIGURE 14 is a diagrammatic showing of the operation of the picker bars in gripping and releasing a holder.
FIGURE 16 is a transverse sectional view through the magazine of FIGURE 15 showing a holder held in place for transport with the magazine.

A form of magazine which may be utilized to retain the holders together during transport is shown in FIGURES 15 and 16. It is indicated generally at 137 and comprises a back plate 138 having top and bottom plates 139 and 141 integrally secured thereto. Attachment lugs 142 extend in opposite directions from the plates 139 and 141 to provide means for mounting the magazine. At one edge of the back wall 138, to the right as viewed in FIGURE 15, is pivotally mounted an elongated latching member 143, S-shaped in cross-section, spring biased into the position shown in FIGURES 15 and 16 to project a latching flange 144 into the slots 135 of an assembled stack of holders 101 to retain them together in the magazine when it is removed from the store. When the magazine is mounted in the store, the flange 145 is engaged by a fixed part to move the latching flange 144 out of the slots 135 to release the holders. At the opposite edge of the back plate 138 is pivoted an aligning member 146 which also extends along the height of the magazine and has a nose portion 147 thereon received within the slots 136 to align the stacked holders vertically. The member 146 is spring biased in a counterclockwise direction as viewed in FIGURE 16.

*The single magazine embodiment*

Referring now more particularly to the embodiment of the invention illustrated in FIGURES 1–8 and 13, there is disclosed a storage, retrieval and display device mounted within a generally rectangular housing 151 made up of a bottom plate 152, a front wall 153, a back wall 154, and side walls 155 and 156, the housing being completed by a cover plate 157.

The side wall 155 has an inwardly projecting integral flange 158 thereon on which is rigidly mounted a platform 159 on whose upper surface is supported the bottom plate 141 of the magazine 137, the lugs 142 on the magazine being secured to the top plate 157 and the platform 159, respectively.

A pair of vertical supporting plates 161 and 162 are rigidly secured to and extend between the bottom plate 152 and the top plate 157. These supporting plates are offset toward each other in the gate area 163 and the magazine area 164 and in the magazine area terminate in flared ends 165 which receive and guide the holders 101 into place as a magazine is inserted into the device. The top and bottom walls of the magazine 137 are thereby received between the top plate 157 and the platform 159, with the holders 101 disposed between the supporting plates 161 and 162 in the magazine area 164.

Figures 3, 4, 5, 6:
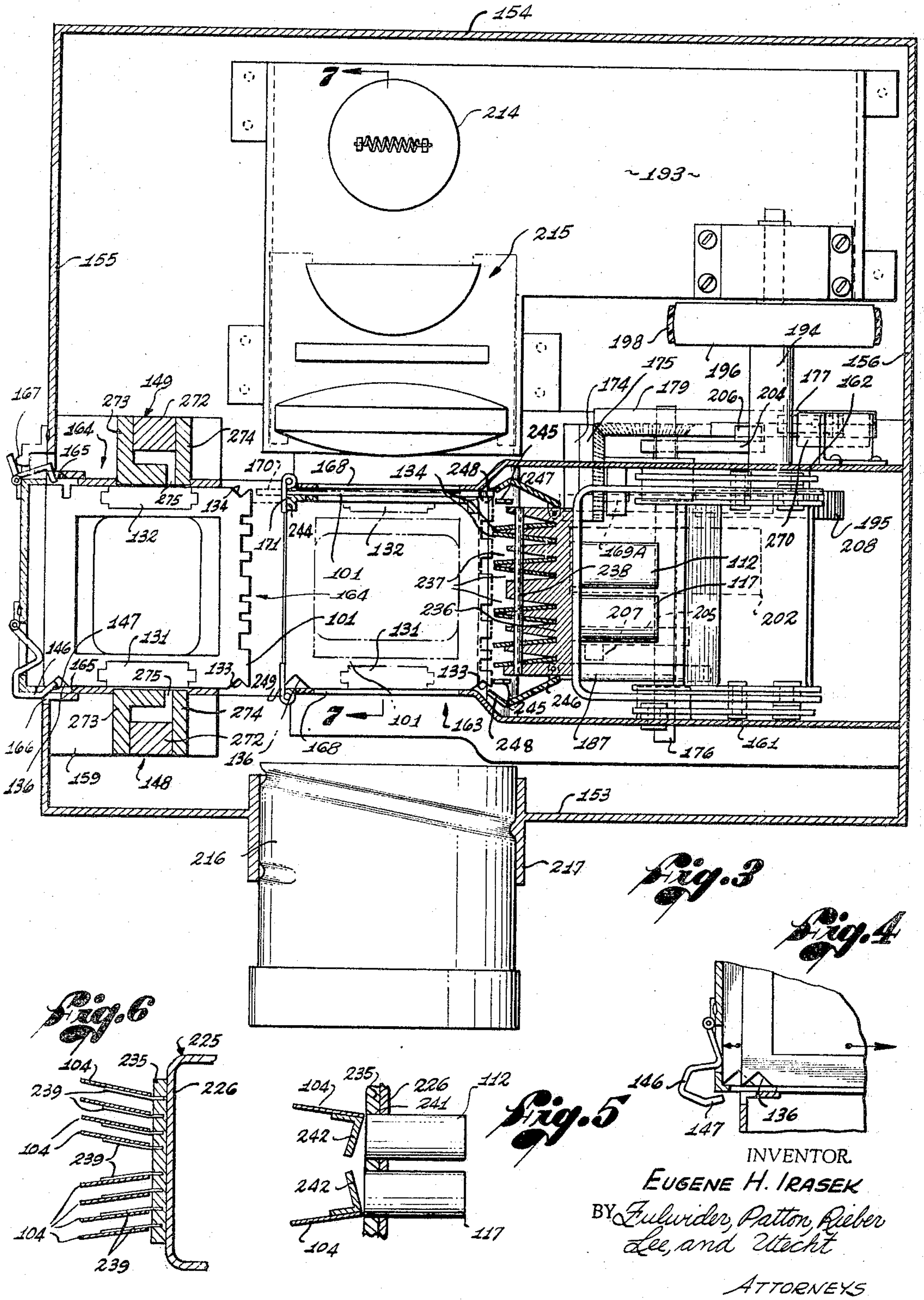
FIGURE 3 is a horizontal sectional view through the embodiment of FIGURES 1 and 2.
FIGURE 4 is a detail view of a magazine corner to illustrate an initial selection operation.
FIGURE 5 is a detail sectional view on the line 5—5 of FIGURE 1.
FIGURE 6 is a detail horizontal sectional view on the line 6—6 of FIGURE 1.

As shown in FIGURE 3, the side wall 155 is provided with a rectangular opening 166 above the platform 159 through which the magazine is inserted and at the edge of the opening has a boss 167 which engages the flange 145 when the magazine is fully inserted to move the latching flange 144 out of the notches 135 in the holders 101, thereby releasing them for movement into the gate area, as selected.

The supporting plates 161 and 162 have elongated slots therethrough through which extend field magnet structures 148 and 149 supported on the platform 159 at opposite sides of the magazine area 164. Each of the field magnet structures comprises a permanent magnet 272 of any permanent magnet material, such as "alnico 5," having its opposite poles in contact with a pair of magnetic elements 273 and 274, of which the element 274 extends straight toward the adjacent magnetic holder inserts, while the element 273 is L-shaped to provide a narrow air gap at 275, the flux across which therefore tends to pass mainly through the magnetic holder inserts 131 and 132. This arrangement not only magnetizes the inserts 131 and 132 to secure mutual repulsion between upper and lower inserts, but also tends to retain the holders positioned within the stack against involuntary removal, with the inserts bridging the air gaps of the stationary magnet structures. With the top and bottom inserts magnetized the same to secure vertical fanning out of the holders, there may be some tendency for the holders to misalign vertically due to magnetic repulsion and the nose 147 on the bias strip 146 enters the notches 136 to maintain the desired vertical alignment.

Figure 7:
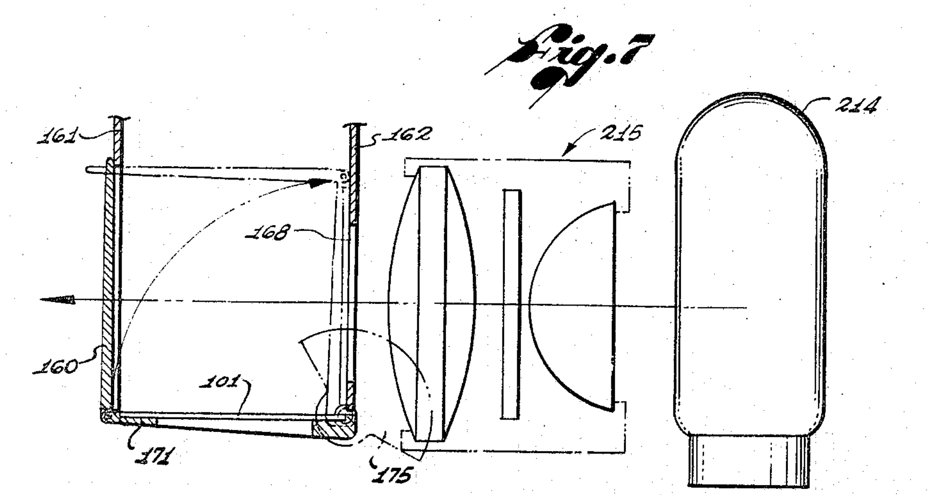
FIGURE 7 is a longitudinal vertical sectional view on line 7—7 of FIGURE 3 through the projection gate, with the optical elements shown in phantom.

The supporting plates 161 and 162 are provided with apertures 168 therethrough which are aligned along an optical axis for the passage of light therethrough. Upon the supporting plate 162 is mounted a trunnion 169 in which at 169A and in the forward edge of the platform 159 at 170 is pivotally mounted a gate 171. The gate 171 extends between supporting plates 161 and 162 in the gate area 163 at a level slightly below the level of the top surface of the platform 159. The top surface of the platform 159 has its right hand portion, as viewed in FIGURE 1, inclined to provide a surface 172 leading to the upper surface of the gate 171. The gate 171 is in the form of a rectangular frame pivoted for rotation about its rear edge, as shown more particularly in FIGURE 3, and rotatable upwardly into a position parallel to the supporting plate 162, with the opening in the gate thereby aligned with the openings 168 in the supporting plates. A black-out screen 160 is pivoted to the free end of the gate 171 to obstruct the optical path when the gate is horizontal, as shown in FIGURE 7. The upper surface of the gate 171 is provided with shallow transverse notches 173 which receive the bottom edges of the address bars 104 as the address bars are moved across the gate, to insure engagement of the address bars with the edge of a holder 101 resting on the top surface of the gate. The gate 171 has an integral arm 174 extending upwardly therefrom adjacent the pivot 169A and upon the arm 174 is mounted a bevel gear sector 175, the axis of the gear being concentric with the pivot axis of the gate. A cam arm 177 is rotatably mounted on a shaft 176 fixedly supported on the plates 161, 162. The cam arm 177 has a longitudinally extending cam slot 178 therein and carries at its upper end a bevel gear sector 179 meshing with the bevel gear sector 175 to effect rotation of the gate 171.

The platform 159 and the bottom plate 141 of the magazine 137 have aligned openings 181 through which extends a finger 182 into engagement with the stack of holders 101 to effect upward movement thereof prior to the return of a holder to the store, to prevent jamming at the bottom of the stack. The finger 182 is integral with an arm 183 pivoted at 184 to supporting plate 162 and having an extension 185 (FIGURE 13) carrying a roller 186 rotatably mounted adjacent its end. Roller 186 is engaged by operating mechanism, to be hereinafter described, to effect movement of the finger 182.

A second cam arm 187 having a longitudinally extending cam slot 188 therein is also pivotally mounted on the supporting shaft 176, with the cam arms 177 and 187 at a fixed transverse spacing and with the cam slots 178 and 188 facing each other. The cam arm 187 has a finger extension 189 above the shaft 176.

An operating electric motor 191 is suspended from the side wall 156, as by studs 192. An elevated platform 193 is rigidly mounted on the base plate 152, as by welding. In bearings supported on the platform 193 and in the supporting plate 162 is rotatably mounted a shaft 194 on which are rigidly mounted a pinion gear 195 and a pulley 196. The shaft of motor 191 has a pulley 197 rigidly mounted thereon and a belt 198 interconnects the pulleys 196 and 197.

A supporting bracket 199 is rigidly secured to the supporting plates 161 and 162 and mounts thereon a bearing support 201 and a figure eight transfer cam 202. In the bearing support 201 and the supporting plate 162 is rotatably mounted a shaft 203 carrying adjacent its opposite ends a pair of cam arms 204 and 205 on whose free ends are mounted cam bosses 206 and 207, respectively. A gear 208 meshing with the pinion 195 is keyed to the shaft 203 at 209 so that shaft 203 and gear 208 rotate in unison but the shaft is movable axially relative to the gear.

Upon the shaft 203 is keyed an arm 211 having an end projecting block 212 rotatably mounted thereon and riding in the figure eight cam slots 213 in the transfer cam 202. The cam 202 functions in known manner to effect axial movements of the shaft 203 in opposite directions as the shaft rotates in the same direction and the camming block 212 passes from one cam slot 213 to the other. By this operation the cam bosses 206 and 207 are alternatively engaged with their cooperating cam slots 178 and 188, respectively.

Also supported on the platform 193 are a projection light bulb 214 and a condenser lens system 215 which are aligned with the openings 168 and with an objective lens system 216 rotatably and adjustably mounted in a cylindrical holder 217 extending through the front wall 153.

*The holder selector mechanism*

Figure 1:
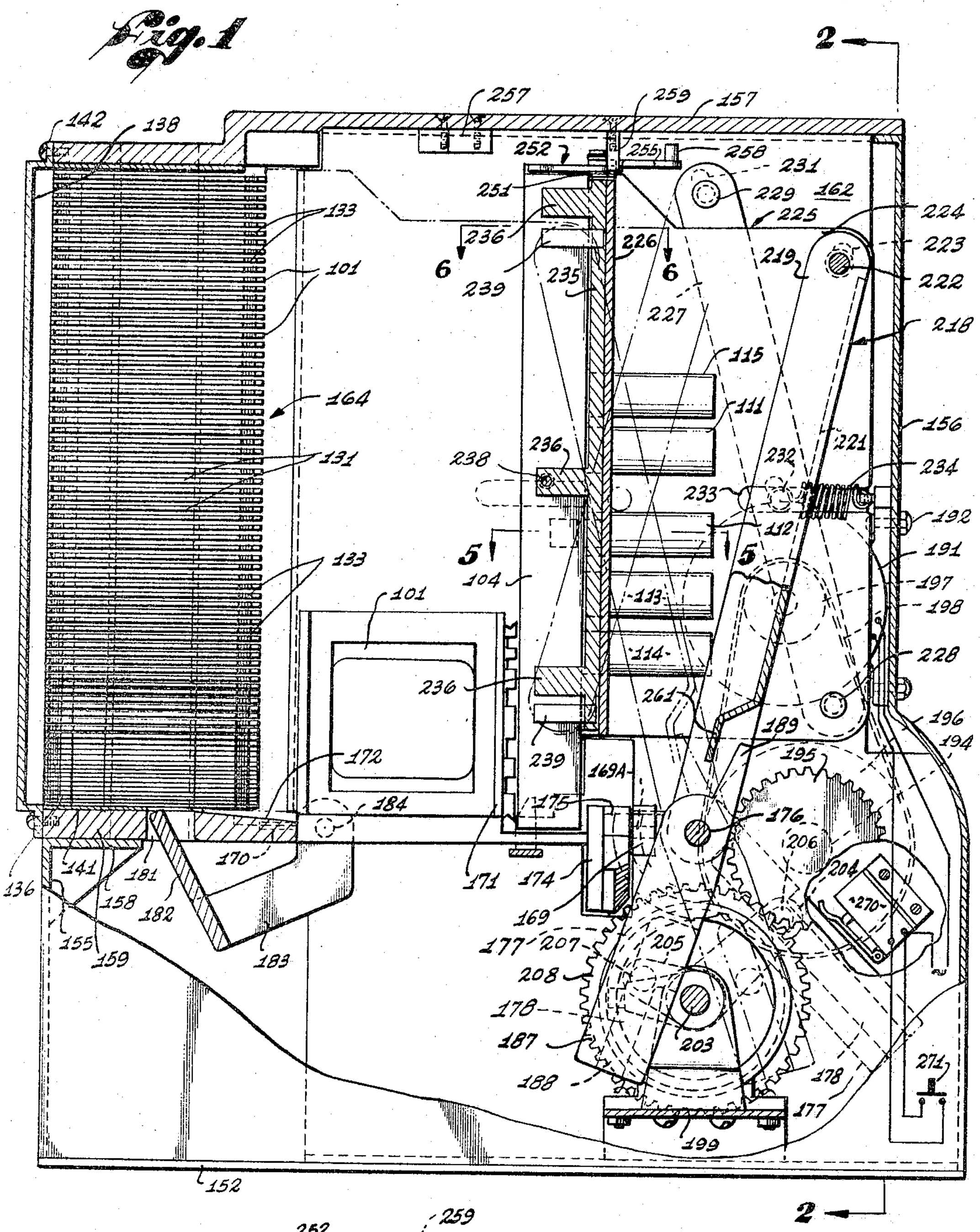
Figure 1A:
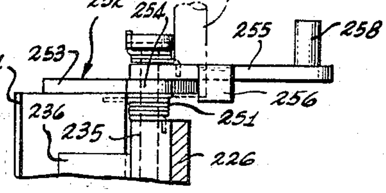

An operating element 218 of a scissors linkage has a pair of opposite side legs 219 connected by a bight 221. The linkage element 218 is rotatably supported on a fixed shaft 176 by its opposite side legs 219 and the upper ends of these side legs are connected by a pin 222 to slots 223 in the upper corners of opposite legs 224 of a rectilinearly movable U-shaped member 225 having a transverse wall or bight 226 interconnecting its legs 224. A pair of links 227 are pivotally connected at 228 to the lower corners of the legs 224 and the upper ends of the links 227 are pivoted at 229 in slots 231 in the supporting plates 161 and 162. The links 227 and the legs 219 of the linkage member 218 are pivotally pin and slot interconnected at their mid points at 232. The legs 224 of the rectilinearly movable member 225 are slotted at 233 to accommodate the pivotal connections 232 for relative horizontal rectilinear movement. A return spring 234 biases the linkage and the member 225 to its retracted position, as shown in FIGURE 1.

Upon the outer face of the bight wall 226 is rigidly secured on address bar supporting member 235 having forwardly projecting flanges 236 integral therewith. The flanges 236 have a plurality of vertically aligned V-shaped notches 237 therein, as illustrated, eight in number to accommodate the eight address bars 104 which are loosely received within the notches 237. The bars 104 are maintained in place in the notches 237 by a pin 238 extending loosely through the bars at the intermediate flange 236, as shown in FIGURE 3. Leaf springs 239 (FIGURES 1 and 6), are secured at one end in the member 235 and bear on the address bars 104 to bias them into their binary zero positions. As shown in FIGURE 6, the zero positions of the four least significant address bars are toward one side of the member 225 and for the four most significant address bars to the other side of the member 225, FIGURE 6, showing all of the address bars 104 in their binary zero positions.

The solenoids 111 through 118 are mounted through openings 241 in the wall 226 and member 235, as shown in FIGURE 5. Each of the address bars 104 has an armature 242 rigidly secured thereto in position to cooperate for attraction to the proper solenoid to move its address bars 104 into the binary one position when the solenoid is energized. The FIGURE 5 representation shows the cooperation of the solenoids 112 and 117 with the next to the least significant address bar 104 and the next to the most significant address bar 104, respectively, the four intermediate address bars being omitted from the figure.

The gate section 163 is divided from the magazine section 164 by a pair of vertically extending strips 243 and 244 pivotally mounted, respectively, to the supporting plates 161 and 162 and spring biased to the inwardly directed position shown in FIGURE 3 to thereby serve as a back guide for a holder withdrawn from the stack and to be dropped onto the gate 171. The strips 243 and 244 are freely rotatable into cutout portions in the supporting plates 161 and 162 upon the movement of the picker bars, to be hereinafter described, therepast. Stationary standards 245 extend above the gate level to be engaged by the front edge of a released holder to insure its proper positioning on the gate.

Picker bars 246 and 247 are pivotally mounted on the member 235 and extend for the full height of the magazine stack, just as do the address bars 104. These picker bars have inturned ends 248 which are adapted to extend within the side edge notches 133 and 134 in the holders to grip a selected holder for withdrawal from the stack. The picker bars 246 and 247 are strongly spring biased, as by springs 251, toward their inward or gripping positions.

Upon the top edge of each picker bar is mounted a bell crank lever 252 having one leg 253 connected to the top edge of the picker bar and its other leg 254 extending inwardly and overlapping at the end with the corresponding leg 254 of the opposite picker bar. Arms 255 are pivotally mounted concentric with the picker bar pivot and have depending fingers 256 engageable with the legs 254 and separately biased theretoward.

A pair of fixed camming members 257 are suspended from the top wall 157 in positions to be engaged by pins 258 on the ends of the arms 255. Also depending from the cover 157 is a pin 259 positioned to be engaged by the overlapped ends of the legs 254 in the retracted position of the member 225. At the left hand side of FIGURE 14, the pins 258 are shown engaged with the cams 257 to hold the picker bar ends 248 in fully separated or opened positions prior to engagement of the picker bars in the notches 133, 134. At the right hand side of FIGURE 14, the picker bars are shown opened, with the member 225 in retracted position, by the engagement of the ends of the legs 254 with the pin 259 to release a selected holder to drop onto the gate. These movements will also be explained in connection with FIGURES 18*a* through 18*c* in describing the operation of the apparatus.

The bight 221 of the linkage member 218 has its lower edge formed forwardly at 261 for engagement by the finger 189 with lost motion therebetween, so that rotation of the cam arm 187 will effect rectilinear movement of the member 225 toward the magazine stack after the cam arm has rotated through a predetermined arc.

*The lifting mechanism*

The cam arm 187 has a hollow stub shaft 262 integral therewith (FIGURES 2 and 13) upon which is keyed an arm 263 for rotation with the cam arm 187. An arm 264 is pivoted to the supporting plate 161 at 265 and has a bell crank lever 266 pivoted on its end and biased relative to the arm 264 in a clockwise direction, as viewed in FIGURE 13, with the clockwise movement of the bell crank engaging with the arm 264. The opposite leg of the bell crank lever 266 has a bearing surface 268 on its end engageable with the roller 186 on the extension 185 of arm 183 which supports the finger 182. A link 269 is pivotally connected to the free ends of the arms 263 and 264.

*Electrical control*

Referring to FIGURE 1, a normally closed limit switch is shown at 270 operated to open position by the cam arm 177 which is shown in full lines in its normal, stopped position with the motor 191 deenergized and the gate 171 in vertical, image-projecting position. There is schematically illustrated in FIGURE 1 an electrical circuit to the motor 191 which includes the normally closed contacts of the limit switch 270 and in parallel therewith the normally open contacts of a pushbutton switch 271.

*Operation of the single magazine embodiment*

In the embodiment of the invention illustrated in FIGURES 1 through 8 and 13, the parts are shown in FIGURE 1 in their normal display position with the limit switch 270 opened by engagement by the cam arm 177, the motor 191 deenergized, and a film chip holder in vertical position behind the gate 171 with a film chip therein exposed in the optical system. To select a new film chip for positioning in the optical system, the address bars 104 are placed into their proper binary positions identifying the particular holder desired by manipulating the switches 105, 106 and 107 to energize the proper solenoids 111–118. The energized solenoids attract their associated armatures 242 to move the address bars 104 connected to those armatures into the binary one positions and the address bars 104 thereby assume their binary coded positions to correspond to and be received within the front edge notches 102 identifying the holder desired.

After so coding the address bar positions, the pushbutton 271 is momentarily engaged to energize the motor 191 and rotate the shaft 203 through pulley 197, belt 198, pulley 196, shaft 194, pinion 195, and gear 208. At this time, cam boss 206 is within cam slot 178 in the cam arm 177 so the arm 177 is rotated while the boss 206 slides within the slot 178 into the dotted line position of FIGURE 1. As soon as the cam arm 177 leaves the limit switch 270, its contacts close and the pushbutton 271 may be released with the action continuing until the limit switch 270 is again opened by the arm 177 with the parts again in position to display the new film chip. As the cam arm 177 rotates, it rotates the gate 171 about its pivotal mounting at 169A, 170 downwardly into the horizontal position shown in FIGURES 7 and 8. At this time the cam block 212 passes through the cross-over of the transfer cam 202 so the shaft 203 is shifted to disengage cam boss 206 from the arm 177 and to engage the cam boss 207 in the slot 188 in the cam arm 187. Cam arm 177 therefore stops in the dotted line position of FIGURE 1 with the gate 171 horizontal.

Cam arm 187 now starts rotating and due to the spacing between the finger 189 and the lower portion 261 of the linkage member 218, the member 225 at first remains stationary. During this initial rotation of the cam arm 187, the arm 263 rotates to rotate arm 264 and the bell crank 266 therewith. The surface 268 engages and bodily moves the roller 186 to move the finger 182 upwardly into the dotted line position of FIGURE 13, thus moving the entire stack of holders upwardly to fan them out and prevent jamming of the holders at the bottom of the stack. As soon as the center line of the bell crank 266 leg passes the pivot point of roller 186, the bell crank rotates counterclockwise relative to the arm 264 and permits the finger 182 to return to its full line retracted position regardless of continued motion of the arms 263 and 264.

Figures 8, 9, 10, 11:
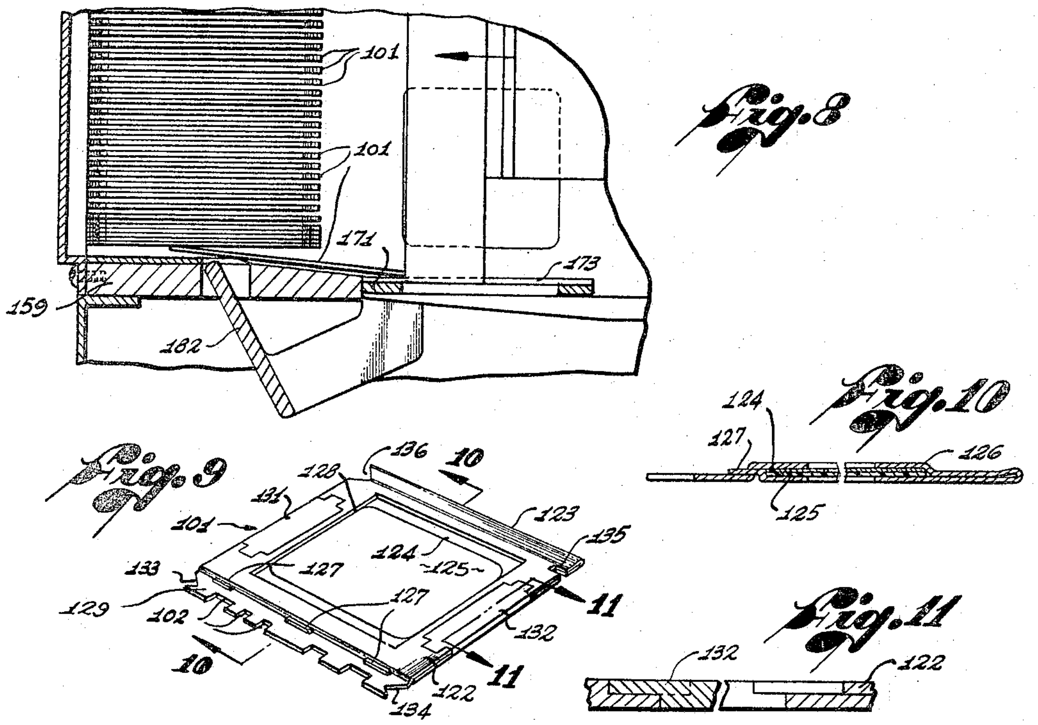
FIGURE 8 is a partial vertical sectional view in the plane of FIGURE 1 showing the return of a holder to the magazine stack.
FIGURE 9 is a perspective view of an individual store item in the form of a film chip holder.
FIGURE 10 is a sectional view through the holder of FIGURE 9 on the line 10—10 thereof.
FIGURE 11 is a detail sectional view on the line 11—11 of FIGURE 9.
Figure 12:
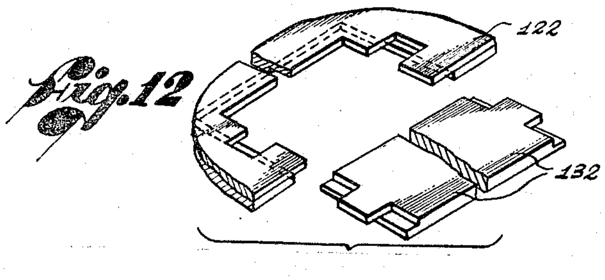
FIGURE 12 is an exploded view illustrating the magnetic side elements and their mounting in the holder.

When the finger 189 engages the portion 261 of the linkage member 218, the U-shaped member 225 and the address and picker bars and the other elements associated therewith are moved rectilinearly toward the magazine stack. The lower edges of the address bars 104 pass through the notches 173 in the upper face of the now horizontal gate 171 and engage the front edge of the holder for the previously projected film chip and return the holder into the magazine stack at the bottom thereof, as shown in FIGURE 8. Prior to the passage of the holder past the opening 181, the finger 182 will have returned to its retracted position and while the magazine stack is then free to move downwardly, the lower holders will be fanned out by the magnetic repulsion between their respective magnetic inserts 131 and 132 so that the lower portion of the stack will be loosely arranged for the easy insertion and return of the previously projected holder into the magazine.

At this time the holders in the magazine will be free of the latch 144 and will be resiliently held in aligned position, as in FIGURE 3, by the nose 147 on the inwardly biased strip 146 and the magnetic attraction of the magnetic inserts 131, 132 to the magnet structures 148 and 149. The magnetic inserts will be magnetized by the magnet structures 148 and 149 to form poles on the inserts positioned above and below like poles on adjacent holders so that mutual repulsion between the holders will exist which will tend to fan the holders out and prevent their stacking and jamming in the magazine stack. This fanning out is assisted by the periodic elevation of the holders in the stack by the upward projection of the finger 182. The mutual repulsion between the individual holders in the stack thereby greatly decreases friction between adjacent holders and facilitates the removal of a selected holder from the stack.

With the member 225 now moving toward the magazine stack, the critical parts assume the position of FIGURE 18*a*, with the picker bars moved inwardly under their bias as the legs 254 left the pin 259. As the member 225 continues to move towards the stack, the pins 258 on arms 235 engage the stationary cams 257 and the fingers 256 engage the legs 254 to rotate the picker bars into their open positions shown in FIGURE 18*b* which also shows the address bars 104 just engaging the forward edges of the holders in the magazine stack. As the member 225 continues its movement toward the magazine stack, all but the addressed holder are moved to the back of the magazine, as shown in the complete full line holder of FIGURE 18*c*, and in FIGURE 16, the strip 146 being rotated clockwise and the nose 147 riding out of the notches 136. This movement of the main stack to the rear while leaving the selected or addressed holder forwardly, is also illustrated in FIGURE 4. In this position, as shown in full lines in FIGURE 18*c*, the pins 258 have passed forwardly of the cams 257 so that the picker bars 246 and 247 snap inwardly under their biases into the notches 133 and 134 in the addressed holder. The addressed holder whose notches receive the address bars 104 is held from moving back with the other holders by magnetic attraction between its magnetic inserts 131, 132 and the stationary field magnetic structures 148 and 149.

Figure 2:
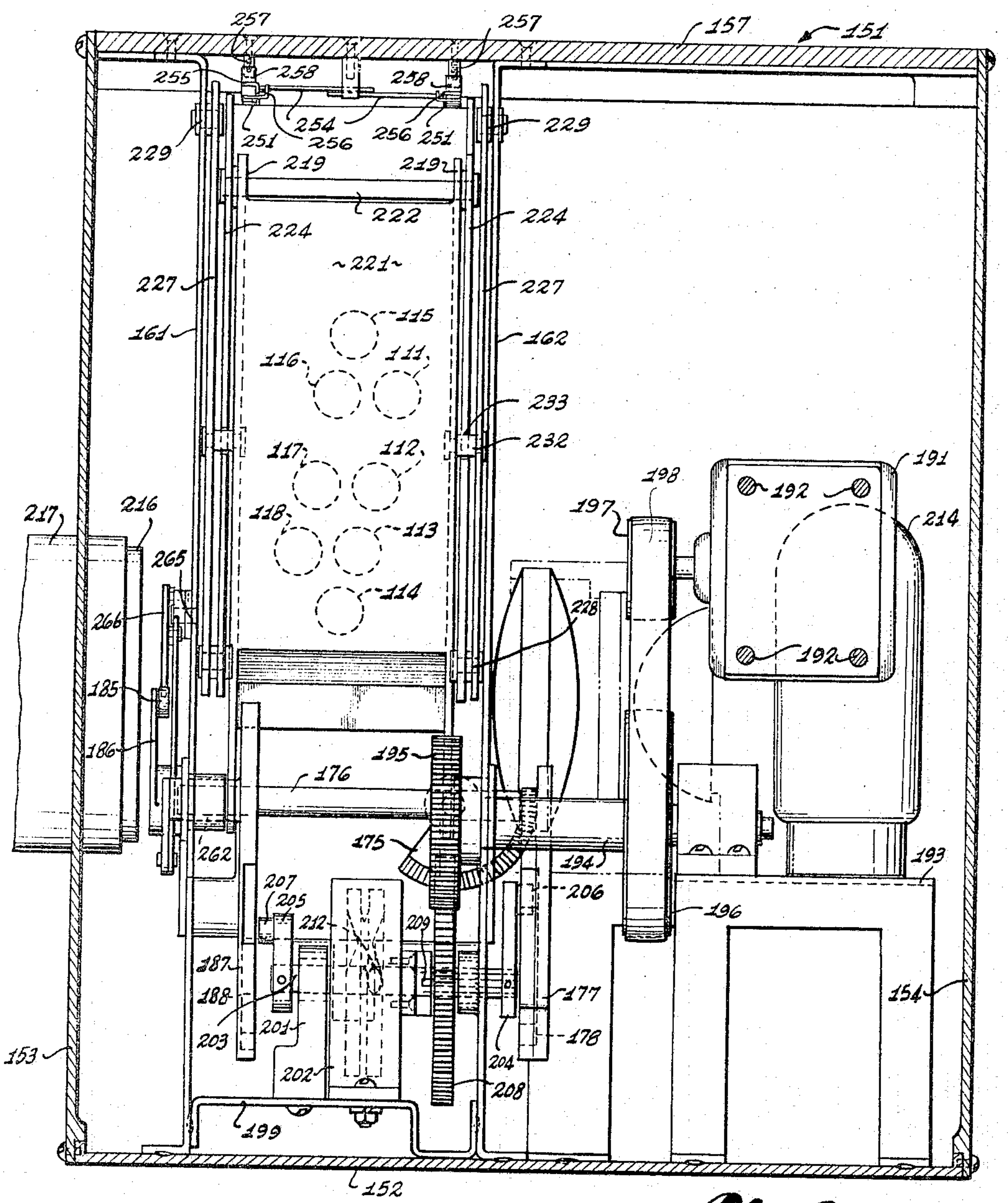
Figure 2A:
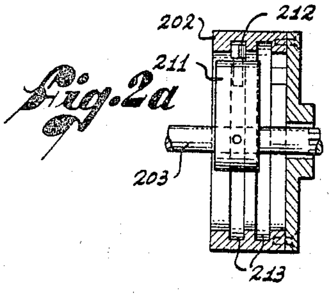

In the full line position of FIGURE 18*c*, the cam arm 187 has rotated to its maximum counterclockwise position, shown in dotted lines in FIGURE 1, and continued rotation of the shaft 203 now rotates the cam arm 187 in a clockwise direction into its full line position of FIGURE 1. The U-shaped member 225 and the parts mounted thereon, together with the selected holder which is clamped between the picker bars, are moved toward retracted position, that is toward the right as viewed in FIGURE 1, under the bias of return spring 234. When the arm 187 reaches its maximum clockwise position, the member 225 and its associated elements will be in fully retracted position as shown in FIGURES 1, 2 and 3. Just prior to the member 225 reaching its full retracted posi, tion, the arms 254 engage the pin 259 to move the picker bars into their releasing positions shown on the dotted line, right hand representations of FIGURES 14 and 18*c*, and the released holder drops downwardly onto the top of the horizontal gate 171. The front edge of the free holder is guided to its proper back position by the standards 245 to insure disengagement of the address bars 104 from within the coding notches 102, the lower portions of the picker bars 246 and 247 having clearance cutouts therein to pass the stationary standards 245.

At the extreme of clockwise rotation of the cam arm 187, the cam block 212 has made its crossover in transfer cam 202 in the reverse direction to that previously-described so as to disengage the cam boss 207 from the cam slot 188 and to re-engage the cam boss 206 with the cam slot 178 in cam arm 177. The cam arm 187 therefore remains in its full line position of FIGURE 1, in which it may be biased or restrained by means not shown, and cam arm 177 now rotates from its dotted line position of FIGURE 1 into the full line position thereof, thereby rotating the gate 171 and the holder thereon upwardly from the horizontal position into the vertical display position. When the gate 171 is vertical, the arm 177 is at its extreme counterclockwise position and has engaged and opened the limit switch 270 to deenergize the motor 191, whereupon the last selected holder remains in display position until the pushbutton operator 271 is again actuated.

Figure 13:
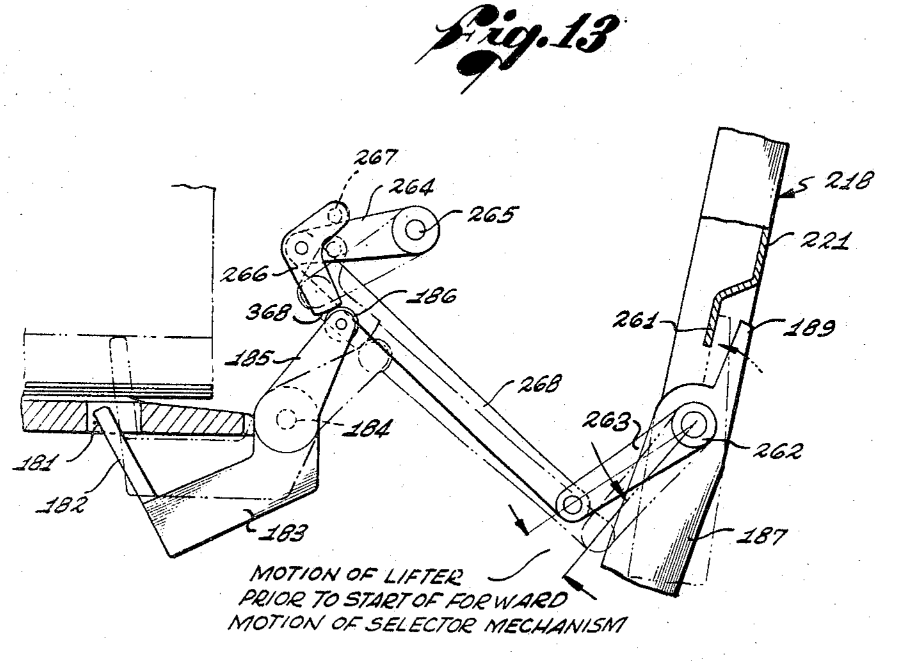
FIGURE 13 is a vertical sectional view showing a portion of the operating mechanism.

As the cam arm 187 returned to its clockwise position, the arm 264 was likewise rotated clockwise until the bell crank 266 snapped back behind the roller 186, as shown in FIGURE 13, positioned to effect upward movement of the finger 182 when the cam 187 is again rotated in a counterclockwise direction.

As soon as the address bars 104 start to move toward retracted position to take a selected holder into the gate position, the main stack of holders again moves forwardly under the magnetic attraction of their inserts 131, 132 into the forward position fully bridging the air gaps 275 in the field magnet structures 148 and 149. At this time the nose 147 returns into the notches 136 to restrain the stacked holders in alignment. As the picker bars and the arms 255 move rearwardly with the member 225, the pins 258 pass freely on the outside of the cams 257, as will be seen from their positions in FIGURE 18c.

*The rotary selector, multiple stack embodiment*

The embodiment of the invention illustrated in FIGURES 20 through 32 employs the same holders and magazines as previously described and its selector mechanism includes the same rectilinearly movable selector member 235 with the same address bars 104 and picker bars 246 and 247. The selector member 235 is here mounted on the outer face of a U-shaped channel 281 having a pair of vertically spaced channel brackets 282 and 283 rigidly attached thereto and extending horizontally rearwardly thereof. Upon the channel brackets 282 and 283 are oppositely extending, aligned vertical bosses 284 and 285 disposed in longitudinally extending slots 286 and 287 in a pair of pivotally mounted arms 288 and 289, each pivotally mounted, as at 291, upon a side plate 292. The arms 288 and 289 are rigidly interconnected for common rotation by a torque shaft 290.

A second side plate 293 is mounted in spaced, opposed relation to the side plate 292 and the selector member 235 and its supporting channel and bracket is guided for reciprocatory movement between the side plates 292 and 293. A bottom plate 294 is connected between the side plates 292 and 293 and is rotatable on a stub shaft 295 extending vertically from a post 296 mounted on a fixed supporting plate 297. A back plate 298 also extends between the side plates 292 and 293 and biasing springs 299 extend between the brackets 282 and 283 and the back plate 298 to bias the selector member 235 to its retracted position.

The selector member 235 and the channel 281 carry the same coding solenoids 111–118 as in the single stack arrangement previously described, and the operation of the address bars, their setting by the solenoids in binary coding and the coding notches in the holders are in all respects the same as in the single magazine stack arrangement. The picker bars operation in the multiple stack arrangement is the same as previously described, except with respect to the release of the holder from the picker bars in the zero or display position of the selector mechanism, as will be explained hereinafter.

The supporting plate 306 is rigidly mounted on a stationary ring 312 having a plurality of recesses 313 in its under face receiving the tops of stationary side magnet assemblies 314. The lower ends of the magnet assemblies 314 are supported on a stationary annulus 315 mounted on flanges 316 carried by the lower side walls 317 of the outer enclosure for the device. The magazines 137 are connected to the ring 312 at the top and the annulus 315 at the bottom with the holders extending between the side magnet assemblies 314 which thereby serve to guide the holders as well as to magnetize and hold them in the stack.

In the multiple magazine embodiment of the invention there are shown, for purposes of illustration only, ten separate magazine positions, as in FIGURE 20. The magnet assemblies 314 are disposed between each pair of magazine stacks as well as at the free sides of the end stacks.

Each element of the magnet assemblies extends for the full height thereof between the annulus 315 and the ring 312. Each magnet assembly comprises a central permanent magnet column 401 engaged at one end by a magnetic plate 402 and at its other end by a channel shaped magnetic member 403. The ends of the legs of the member 403 and the plate 402 are separated at 404 and 405 to supply air gaps thereat from which the flux fringes into the magnetic inserts 131 and 132 in the holders 101 in the same manner and for the same purpose as previously described for the magnet structures 148 and 149 in the single magazine stack embodiment. The permanent magnet 401 and the magnetic elements 402 and 403 are cemented together and within an outer enclosure provided by end plates 406 and 407 of non-magnetic material, such as aluminum, and side plates 408 and 490, likewise of non-magnetic material. The holders 101 are thereby held in place and guided for movement into and out of the magazines by the plates 408 and 409 at opposite sides thereof and the holders are held in their normal positions in the stack by the bridging of the air gaps 404 and 405 by the magnetic holder inserts 131 and 132. The magnet assemblies magnetize the holder inserts to secure the mutual repulsive effects with fanning out of the individual holders and the lessening of friction therebetween, as previously described in the single stack embodiment.

*The rotary mechanism*

The side plates 292 and 293 are rigidly secured to the under face of, and thereby suspended from, a rotary plate 301 having a plurality of edge latching and indexing notches 302 therein (FIGURES 21 and 27). The plate 301 is mounted for rotation about the lower end 303 of a hollow shaft or hub 304 which has an upper extension 305 and is integral with a stationary supporting plate 306. A central, circular, upward extension 307, integral with the rotary plate 301, has edge teeth to form a pinion meshing with a gear wheel commutator 308 rotatably suspended by a shaft 309 from the stationary plate 306. Depending from the rotating plate 301 are a pair of integral clutching bosses 311.

A large pulley wheel 318 has a central hub 319 rotatably mounted over the upper end 305 of the hollow shaft 304. An operating member 321 is rotatably and axially shiftably mounted within the hollow shaft 304 and is keyed for rotation with the pulley wheel 318 and 322, the operating member 321 being thereby rotatable by the pulley wheel 318 at all times while axially shiftable relative thereto. The operating member 321 has a bore 323 therethrough, in the upper portion of which is integrally secured a stub shaft 324 rotatably supported at its upper end in a fixed bracket 325. A thrust bearing 326 is rigidly mounted on the shaft 324 and a pair of arms 327 and 328 are engageable with the under surface of the thrust bearing 326 to lift the shaft 324 and operating member 321. The arms 327 and 328 are independently operable and connected respectively to the armature 329 and 330 of electromagnetic operators 331 and 332.

A bell crank lever 333 has a fixed pivot at 334 and is provided with a roller 335 at one end engageable by the upper surface of the thrust bearing 326 to effect movement of the bell crank. A link 336 is pivoted to the opposite end of the bell crank at 337 and has its other end pivotally connected at 338 to a latch arm 339 pivoted at 340 to a stationary bracket having its latching end extendable into the notches 302 to lock the rotating plate 301 in its stack indexed and zero positions.

The holder selector mechanism is fine indexed with the various stack positions around the device by a roller 475 rigidly mounted on the selector frame, as shown in FIGURES 21 and 28, and indexing into generally radially extending slots 476 in an inwardly extending flange 477 rigid with the stationary ring 312. The selector mechanism is thereby accurately indexed with the addressed stack in which the addressed holder is located so that the coding bars 104 will accurately correspond with the positions of the coding slots in the front edges of the holders.

At the zero station notch 302 radially outward from the selector mechanism, a radially movable strip 341 is slidably supported on the underside of the rotating plate 301. A pivoted member 342 is also mounted beneath the plate 301 at this point and has an upper extension 343 engageable by the strip 341 and a lower nose 344 positioned to engage the arms 254 on the picker bars to move the picker bars to holder releasing positions. The latch arm 339 is located at the zero, display position of the device so that when it is engaged in the zero station notch 302, it will move the strip 341 inwardly to rotate the pivoted member 342 and move the arms 254 and thereby the picker bars 246 and 247 into holder releasing positions.

Rigidly mounted on the operating member 321 are a pair of clutching notches 345 movable rectilinearly with the member 321 into clutching index with the bosses 311 on the rotating plate 301. Beneath the clutching notches 345 is a switch operating groove 346 whose fuction will be explained hereinafter. An operating arm 347, having a depending cam boss 348 at one end and an operating extension 349 at the other, is mounted on a shaft 351 loosely received within the bore 323 in the operating member 321. The arm 347 is prevented from dropping downwardly by sliding engagement with the top of the selector mechanism operating arm 289. A cam plate 352 rests loosely on the top of the operating arm 347 so as to be rotatable relative thereto. Another cam plate 353 is splined to the operating member 321 at 354 so as to be rotatable therewith but shiftable relative thereto.

A floating annulus 355 is disposed above the cam plate 353 with a thrust bearing 356 therebetween. A spring washer 357 is disposed between the cam plates 352 and 353 to bias them apart. A pin 358 is rigidly mounted on and depends from the cam plate 353 and passes at all times through a hole in the cam plate 352 so that the cam plate 352 will always be rotated by and with cam plate 353. A hole 359 in the operating arm 347 receives the pin 358 when the cam plate 353 is moved toward the operating arm 347 to thereby cause rotation of the arm 347 with the cam plates 352 and 353.

Three pins 361 are rigidly secured to and extend upwardly from the annulus 355, passing through holes in the rotating plate 301 to be rotated therewith, and into engagement with the under surface of the stationary supporting plate 306. The pins 361 are located at different radii from the axis of rotation and in the zero position of the selector mechanism project upwardly into notches 362 in the under side of the plate 306 to thereby permit the annulus 355 and the cam plate 353 to move into their upper positions under the bias of the spring 357. As soon as the selector mechanism rotates with the plate 301 out of the zero display position, the ends of the pins 361 are moved downwardly out of the notches 362, thereby forcing the cam plate 353 downwardly and the pin 358 into its clutching opening 359 in the operating arm 347. With the pins 361 in the notches 362 in the zero position of the device, it will be seen that the arm 347 is disconnected and cannot effect reciprocation of the selector mechanism.

The boss 348 is positioned on the arm 347 so that upon rotation of the arm, the boss 348 will enter the cam slot 287 in the selector mechanism operating arm 289 to thereby rotate the arm 289 in a clockwise direction, as viewed in FIGURE 22, to move the selector mechanism outwardly, the address bars 104 moving into engagement with the holders in the addressed magazine stack. An electric motor 361 is mounted in a frame 362 rigidly secured to the ring 312. The motor shaft has a pulley 363 thereon which drives the pulley wheel 318 through a belt 364.

*The rotary gate*

A gate 365 is pivotally mounted at 366 to the opposite side walls 292 and 293 and is dropped downwardly into the full line vertical position of FIGURE 21 to display a film chip in a holder in the optical system shown in FIGURE 21, similar to that previously described and shown in FIGURE 3. A limit switch 367 is mounted on the bottom bracket 368, with elements of the optical system, and is engaged by and moved to open position by the gate 365 when in its fully lowered position. A holder retaining clamp 369 of arcuate form is pivoted on the gate 365 at 371 and is biased by a torsion spring 370, into the position shown in full lines in FIGURE 21 where it holds the film clip tightly against the front face of the gate. A cam plate 372 is fixedly mounted to one or both of the side walls 292, 293 and the holder clamp 369 has a side finger 373 thereon which engages the forward edge of the cam plate 372 to move the clamp 369 into its retracted position shown in dotted lines in the upper position of the gate 365, FIGURE 21. This releases the holder on the now horizontal gate face so that it can be moved off the gate and into its magazine stack. The top face of the gate is again notched as in the previous embodiment and the gate is in the form of an open rectangle through which the optical axis passes. The gate 365 has an arm 374 extending therefrom which is connected by a link 375 to one end of a bell crank 376 pivoted at 377 to the side plate 293. The opposite end of the bell crank 376 has a top flange 386 projecting inwardly through a slot 387 into the path of cam plate 353 when the cam plate is in its upper position. In its lower position the cam plate 353 passes under the flange 386. The gate 365 is biased upwardly toward horizontal position. These elements are best shown in FIGURES 23 and 24 where the gate 365 is shown in its upper, horizontal position.

*The rotary lifting mechanism*

The multiple stack arrangement employs a stack lifting finger 381 which performs the same function as the finger 182 in the single stack embodiment. The end of finger 381 rides in an annular slot 380 in the bottom surface of the annulus 315 and beneath each magazine stack there is provided a through hole 389 through which the finger 381 is projected to move the stack of holders upwardly as described for the single stack embodiment. The finger 381 is pivoted, as at 382, to the opposite side walls 292 and 293 and has an extension arm 383 connected by a link 384 to one leg of a bell crank 385 pivoted at 377 on the side plate 293. The other leg of bell crank 385 projects at 378 into the path of the extension 349 on the operating arm 357. The extension 349 on the operating arm 347 extends through the slot 387 to engage the end 378 of the bell crank 376.

*The commutator*

The gear wheel commutator 380 is desirably of insulating material and carries on its upper surface a pair of semi-circular commutator segments 391 and 392 separated by a pair of diametrically opposite non-conducting spaces 393 and 394. The commutator segments 391 and 392 are integrally connected to terminals 395 and 396, respectively, which may be connected to flexible circuit leads 397 and 398 as in the wiring diagram of FIGURE 31. Brush contacts 390 extend in insulated relation through the supporting plate 306 into engagement with the commutator segments 391 and 392 as shown mechanically in FIGURE 21 and electrically in the diagrammatic representation of FIGURE 31. There is one brush contact for each magazine stack position, ten as illustrated, as well as an eleventh brush at the zero position input.

*The sequencing switches*

Rigidly secured to and depending from the rotary plate 301 is an insulating support 411. Pivotally mounted on the support 411 is a multiple star wheel assembly 412 pivotally mounted for rotation on a vertical pin 413. The star wheels are integrally joined together for common rotation and comprise an actuated wheel 414 and switch actuator wheels 415 and 416. The actuated wheel 414 is horizontally aligned with the cam plate 352 and has six equally spaced nodes 417 thereon adapted to be successively engaged by the node 352A on the cam plate 352 to effect 60 degree rotation of the star wheel assembly 412 for each rotation of the cam plate 352. A spring arm 418 engages adjacent nodes of the star wheel 414 to releasably restrain it in its successive positions. Electric switches 419 and 421 are mounted on the support 411 in superposed relation to be actuated respectively by the nodes of the star wheels 415 and 416.

Referring to FIGURE 28*b*, the star wheel 415 has four operating nodes thereon, two relatively longer nodes 422, 180 degrees apart, and two relatively shorter nodes 423, also 180 degrees apart, the longer and shorter nodes being arranged in pairs 60 degrees apart to leave 120 degrees between the pairs of longer and shorter nodes. The switch 419 comprises a switching arm 424 cooperating with a pair of opposed stationary contcats 425 and 426 and a stationary contact 427 positioned to be engaged by the switching arm 424 only when the arm is engaged by a longer node 422. Thus, in the operation of switch 419, the switching arm 424 is normally in contact with the stationary contact 426; it is moved into contact with the stationary contact 425 by a shorter operating node 423, and is moved into engagement with both contacts 425 and 427 by a longer node 422.

Referring to FIGURE 28*a*, the star wheel 416 has three equally spaced operating nodes 428 thereon, thus disposed 120 degrees apart. They cooperate with a switching arm 429 on switch 421 to engage it with a stationary contact 431 and to permit the arm to normally engage stationary contact 432 when not moved by a node 428.

An electric switch 433 is also carried by the insulating support 411 and has a pair of opposed stationary contacts 434 and 435 between which move a pair of relatively insulated switch blades 430 and 430A insulatedly connected to a switch arm 436. The switch blades 430 and 430A are biased to normally close contact 435 and open contact 434. The switch arm 436 carries a cam roller 437 at its end engaged by the node 352A on the cam plate 352 to open contact 435 and close contact 434.

Also mounted on the under surface of the rotating plate 301 is an electric switch 438 having a stationary contact 439 and a switch arm 441 cooperating therewith. The free end of switch arm 441 extends into the slot 346 in the operating member 321 so as to be moved upwardly with the operating member upon energization of the electromagnetic operators 331, 332. The switch arm 441 has a depending spring arm 442 rigidly secured thereto and adapted to snap over an abutment flange 443, rigidly mounted to the cam plate 352, when the cam plate is in the position shown in FIGURES 29 and 30 to thereby hold the switch 438 closed even when the operator 321 is released and moves to its downward position. In rotation of the cam plate 352 relative to the plate 301 the abutment flange 443 first releases the spring arm 442 and in subsequent engagement moves it outwardly as at FIGURE 30 without closing the switch 438.

*The wiring diagrams*

The diagram of FIGURE 31 corresponds to the ten magazine stack positions of the multiple-stack embodiment of the invention so far described. The commutator segment 391 and the electromagnetic operator 331 are connected to drive the operating motor 361 in what may be considered a clockwise direction, while the commutator segment 392 and electromagnetic operator 332 are connected to drive the motor 361 in the opposite or counterclockwise direction. The stack selection switches are shown for purposes of simplicity as manually operated switches, although it is obvious that they may be computer operated or otherwise programmed to be operated to address the stacks in a desired sequence. The switches for selecting the magazine stacks are designated 445A through 445J and are connected, respectively, to brushes 390A through 390J cooperating with the commutator segments 391 and 392 and the non-conducting spacing 393 therebetween. A "zero" position input line 446 is connected to a brush 447 located between stack selection brushes 390E and 390F. The stack selection switches 445A through 445J are connected to a power supply line 448, the other side 449 of which is connected to the mid point between the electromagnetic operators 331, 332. The switches 445A through 445J are of the single-pole, double-throw type having normally closed and normally open contacts and connected serially thorough their normally closed contacts so that if more than one switch is operated, only that of the higher letter will have any significance. Thus, if for example switch 445H is operated, power is supplied to brush 390H and all of switches 445A through 445G are disconnected from the line 448 and are ineffective to energize their respective brushes, even if moved to selecting position.

In the wiring diagram of FIGURE 32 the lines 446 and 448 are shown going into a block 451 which corresponds to the interrupted outline block of FIGURE 31 containing the commutator and brushes and the stack selection switches, the control lines 397 and 398 leading therefrom to the electromagnetic operators 331 and 332. The line 449 to the electromagnetic operators 331 and 332 is connected to the main power line 452 through a manual up-date switch 453 and contact 434 of switch 433. Electromagnetic operator 331 operates both a single-pole, normally closed set of contacts 454 and a double-pole, normally open set of contacts 455, the double-pole contacts serving to connect the motor 361 across the lines 452 and 456 for rotation in a clockwise direction. The electromagnetic operator 332 operates both a single-pole, normally closed set of contacts 457 and a double-pole, normally open set of contacts 458, the latter serving to connect the motor 361 across the line for rotation in a counterclockwise direction. A relay 459 operates a double-pole, normally open set of contacts 461 to connect the motor 361 for rotation in a clockwise direction.

The relay 459 is connected across the line through the normally closed contacts 454 and 457 and a three-leg parallel circuit indicated generally at 462. One leg of the circuit 462 is closed through the switch 438; another leg of the circuit is closed through a manually operated "go" switch 463. The third leg of the parallel circuit 462 is closed through the normally closed contact 464 of limit switch 367 and the contact 435 of switch 433. The limit switch 367 is of the two-pole, normally closed type and has a second set of normally closed cooperating contacts at 465.

A selector switch 466 may be operated to either of its two positions to select either Mode I or Mode II operation for the rotary selector embodiment. Contact 427 is connected to one side of an indicator light 467, the opposite side of which is connected to the line 452. The line 467 is paralleled by a relay 468 which has double-pole, normally open contacts at 469 and 471. The contacts 469 are in series with the contacts 465 on the limit switch 367 to provide a holding circuit for the relay 468. The contacts 471 control power to the address bar solenoids 111 through 118. The contacts 471 are paralled by a second set of normally open contacts 472 controlled by a relay 473 connected across the line through the Mode I contacts of the selector switch 466.

*Operation of the rotary selector embodiment*

The rotray selector, multiple stack embodiment of the invention has two alternate operating modes identified as Mode I and Mode II and selected by the position of the selector switch 466 which is shown in FIGURE 32 in the position selecting Mode I operation. Mode I operation provides for random access to the holders in a single stack only and not only returns a selected holder back to its stack, but selects a new holder only from that same stack. In Mode I operation only a single "go" signal is required and a stationary position of the parts always positions a holder in the gate position. In the arrangement so far described, without a look-ahead feature, when the "go" switch is closed, the gate moves the holder into a level position in the selector mechanism which is then rotated by the plate 301 to the single stack position being addressed. The selector mechanism then moves rectilinearly to return the holder just viewed and to pick up the next desired holedr, the address bars 104 having been reset while the previous holder was projected. The newly selected holder is pulled out of the stack by the selector mechanism which then rotates back to the "zero" position and the gate moves down into projection position and stays there until the next "go" command.

In Mode II operation even of the simplest version there are two "go" commands. The first of these is with a holder in the gate in the projection position and is initially the same as described above for the Mode I operation. However, instead of selecting a new holder and returning to the "zero" position, the selector mechanism moves back to its retracted position after returning the holder to its stack and waits there for the operator to address a new stack and a new holder. When this happens, the selector mechanism goes directly to the newly addressed stack, selects the addressed holder and returns to the "zero" position where the holder is lowered by the gate into the projection position. To prevent the selector mechanism withdrawing the same holder it is returning to the previous stack, the address bars 104 are all moved to their binary zero positions by deenergizing all their address solenoids when the gate moves into the projection position.

Since the holder address solenoids 111 through 118 are, in this embodiment, carried on the rotating selector mechanism, it is desirable that this mechanism be prevented from rotating continuously in the same direction because of the requirement of slip rings or other complications. The commutator segments 391 and 392 provide for operation of the motor 361 in appropriate opposite directions to move the selector mechanism to the magazine stacks and in reverse to the "zero" position so that flexible connectors are adequate for connecting to the address bar solenoids.

*Mode I operation*

In Mode I operation selector switch 466 is moved into the position shown in FIGURE 32, and a stack selection switch 445 is operated to select the stack to which, and to which only, random access of the holders therein will be conducted. With the parts in their "dwell" or viewing positions, the last viewed holder will be in projection position with the gate 365 in its lowered, vertical position shown in full lines in FIGURE 21. The electromagnetic operators 331 and 332 will be deenergized so that their normally closed contacts 454 and 457 will be closed and their double-pole, normally open contacts 455 and 458 open. Double-pole contacts 461 are also open because relay 459 is deenergized. Before initiating a new operation to return the last viewed holder to the selected stack and select a new holder from the same stack, the coding switches 105 through 107 are operated to energize the proper address solenoids 111 through 118 to place the address bars 104 in their binary coded address positions for the new holder.

When the "go" switch 463 is closed, a circuit is completed through the corresponding leg of the parallel circuit 462 and the normally closed contacts 454 and 457 to the relay 459 which closes double-pole switch contacts 461 and energizes motor 361 for rotation in the clockwise direction. Rotation of motor 361 rotates the pulley wheel 318 and therewith the operating member 321 to rotate the cam plate 353, continuing its previously interrupted revolution. The cam plate 353 engages the flange 386 on the bell crank 376, rotating it and moving link 375 to rotate gate 365 upwardly into its horizontal position shown in FIGURE 23 and, in dotted lines, in FIGURE 21. When gate 365 leaves limit switch 367, contact 464 closes to complete a circuit through the top leg of parallel circuit 462 whereby switch 463 may be released without effect.

Cam plate 352 rotates with plate 353 through the constant engagement of pin 358 in a hole in cam plate 352. When its node 352A engages roller 437, it operates switch 433 and opens contact 435, thereby deenergizing relay 459 and opening contacts 461 to stop motor 361. The operation of switch 433 also closes contacts 434 to complete a circuit to which ever of the electromagnetic operators 331 and 332 has its computator segment 391, 392 beneath the brush 390 of the selected magazine stack whose holders are to be accessed in Mode I operation. The appropriate electromagnetic operator 331, 332 is thereby energized by the closing of contact 434 to close the corresponding double-pole contacts 455, 458 to drive the motor 361 in either clockwise or counterclockwise direction, depending on the location of the selected magazine stack with respect to the "zero" position of the device.

Upon energization of the appropriate electromagnetic operator 331, 332, its armature 329, 330 will be moved to attracted position and its arm 327, 328 will move the thrust bearing 326, shaft 324 and operating member 321 upwardly to engage the clutching slots 345 about the bosses 311. Upward movement of the thrust bearing 326 rotates the bell crank 333 to move the latch arm 339 out of the slot 302 to unlatch the rotating plate 301. Movement of the latch arm 339 out of the slot 302 permits the strip 341 to move outwardly and the operator 342 to move in a counterclockwise direction, as viewed in FIGURES 21 and 28, to release the picker bar arms 254. Upon engagement of the clutching slots 345 with the bosses 311, the plate 301 rotates with the operating member 321 and the pins 361 ride out of the slots 362 to move cam plate 353, annulus 355, thrust bearing 356 downwardly to move pin 358 into the hole 359 in operating arm 347, thereby effecting rotation of all of the enumerated parts together. The selector mechanism thereby remains in its retracted position during rotation of the plate 301. When the operating member 321 moves upwardly, the switching arm 441 is moved to engage contact 439 and the spring arm 442 snaps over the abutment flange 443 to hold the switch 438 closed when the operating member 321 again moves downwardly upon deenergization of the electromagnetic operator.

While the plate 301 rotates, its pinion portion 307 effects rotation of the commutator plate 308 and the rotation of plate 301 continues until the insulating space 393 between the commutator segments 391 and 392 is positioned at whichever brush 390A through 390J is energized by the operated stack selection switch 445A through 445J. At this time the previously energized electromagnetic operator 331, 332 is deenergized and the associated double-pole contacts 455, 458 are moved to open position to deenergize and stop motor 361 and plate 301 with the selector mechanism opposite the addressed magazine stack. Deenergization of the electromagnetic operator opens its armature 329, 330, permitting operating members 321 and thrust bearing 326 to move downwardly. This separates the clutching slots 345 from the bosses 311 and permits latch arm 339 to enter the slot 302 of the addressed stack position to lock plate 301 in rough indexed position.

Deenergization of the electromagnetic operator closes its associated contact 454, 457 to establish a circuit for relay 459 through the switch 438 which is held closed by the spring arm 442 resting on the top of the abutment flange 443. This closes double-pole contacts 461 to rotate the motor 361 in a clockwise direction. Rotation of motor 361 rotates pulley wheel 318 and operating member 321 to rotate cam plate 353, and, since pin 358 is now engaged in the hole 359, operating arm 347 also rotates. In the initial rotation of operating arm 347, its extension 349 engages the projection 378 on bell crank 385 to rotate it counterclockwise, as viewed in FIGURE 23, to move the finger 381 upwardly through slot 389 to elevate the stack of holders in the magazine. The extension 349 then moves beyond the projection 378 permitting the finger 381 to move downwardly under biasing means (not shown). The arm 347 then moves its camming boss 348 into slot 287 to effect rotation of arms 289 and 288. As the arms 288 and 289 rotate, bosses 284 and 285 on brackets 282 and 283 are moved diametrically of plate 301 to effect like rectilinear movement of the selector mechanism including the member 235 and the address and picker bars supported thereon to return the holder on top of the gate into the addressed stack at the bottom thereof. As the selector mechanism moves toward the addressed stack, roller 475 enters the appropriate slot 476 to fine index the selector mechanism with the stack to insure proper location of the address bars relative to the coding slots in the holders. The selector mechanism is guided in this rectilinear movement between the opposite side plates 292 and 293.

The operation of selecting and removing an addressed holder is the same as that described in the single stack embodiment of the invention, that is, the address bars 104 engage and move rearwardly all of the holders except the one unique holder having front edge notch coding to receive the address bars as they are positioned by their addressing solenoids. The picker bars 246 and 247 are operated by the same members 257 (FIGURE 27) as in the single stack arrangement to engage the ends 248 of the picker bars in the opposite notches 133, 134 in the addressed holder, FIGURE 27 showing the selection of the addressed card just prior to the snapping of the ends of the picker bars into engagement with the side notches. As the picker bars snap into engagement with the addressed holder, the arms 288 and 289 will be rotated through their maximum forward position by the cam boss 348 and continued rotation of the operating arm 347 moves the cam boss 348 out of the slot 287 to free it from the arm 289. The selector mechanism now returns to its retracted position under the bias of the springs 299, thereby removing the selected holder from the stack while carried by the picker bars upon which it remains supported.

When arm 347 commenced to rotate, cam plate 352 rotated therewith and node 352A left the roller 437 to permit closing of contact 435 and opening of contact 434. After a slight further rotation, the flange abutment 443 rides out from under the spring arm 442 which snaps downwardly to open switch 438 but without effect, since a circuit paralleling switch 438 is now provided through contacts 464 and 435. As the node 352A passes the actuated star wheel 414, it engages a node 417 thereon to rotate it and star wheel 416 through 60 degrees. This permits switch 421 to move to its normal position with contact 431 opened and contact 432 closed. When the cam plate 352 completes a revolution, the node 352A again engages roller 437 to open contact 435. This opens the circuit to the relay 459 to open contacts 461 and deenergize motor 361. Switch 438 is open at this time since the flange abutment 443 simply pushes the spring arm 442 out of position, as shown in FIGURE 30, without closing contacts 438.

With the closing of contact 434, which occurs when contact 435 is opened, a circuit is completed to that one of the electromagnetic operators 331, 332 which was not energized for the previously described rotation of the plate 301 to the addressed magazine stack. This opens its associated contact 454, 457 and closes its associated contacts 455, 458 to rotate the motor 361 in a direction reverse to that previously selected, thereby returning the selector mechanism to the "zero" position. When the electromagnetic operator is energized, the latching arm 339 is withdrawn to free the plate 301 for rotation. The operating member 321 is moved upwardly by the armature 329, 330 of the electromagnetic operator to engage the clutching slots 345 with the bosses 311 to thereby effect rotation of the plate 301, the cam plate 353, the cam plate 352, and the operating arm 347, all of which are tied together for rotation as a unit thereby rotating the selector mechanism bodily with the plate 301 on which it is supported. When the operating member 321 moves upwardly, it moves switch arm 444 to close contact 439 and spring arm 442 snapped above the abutment flange 443 to maintain it closed until there is relative rotation between the cam plate 352 and the plate 301. As plate 301 rotates, its pinion 307 rotates the commutator plate 308 until the insulating space 393 between the commutator segments is disposed at the "zero" position brush 447, this being now energized through the line 446, contact 431, switch arm 429 and the selector switch 466. At this time the electromagnetic operator is deenergized, since it is no longer fed through a commutator segment, and the operating member 321 moves downwardly, permitting latching arm 339 to enter the slot 302 adjacent to the selector mechanism to lock plate 301. Arm 339 moves the strip 341 toward the right, as viewed in FIGURE 28, thereby rotating member 342 clockwise to engage picker bar arms 254 and move the picker bars 246, 247 out of engagement with the selected holder, releasing it to fall vertically onto the upper surface of the now horizontal gate 365. Deenergization of the electromagnetic operator closes its associated contact 454, 457 and opens its associated double-pole contacts 455, 458 through which the motor was energized for return rotation.

Closing of contacts 454, 457 completes a circuit to relay 459 through switch 438 which is held closed by the spring arm 442. This closes contacts 461 and drives motor 361 in a clockwise direction with the plate 301 locked stationary and the selector mechanism indexed in the "zero" position. In this "zero" position pins 361 have entered the notches 362 so that the annulus 355 has moved upwardly, thus permitting the cam plate 353 to move upwardly under the bias of the spring 357 to disengage the pin 358 from the clutching hole 359 in the arm 347. Therefore, continued rotation of the operating member 321 rotates the plates 352 and 353 but *not* the operating arm 347. As the plate 353 rotates, its camming edge leaves the flange 386 on the bell crank 376, permitting it to return counterclockwise, as viewed in FIGURE 23, under the bias of a spring (not shown) to lower the gate 365 into the full line position of FIGURE 21. As the gate rotates downwardly, the ears 373 on the latching member 369 leave the cam surface 372 and the latching member 369 rotates clockwise under the bias of spring 370 into the position shown in full lines in FIGURE 21 where it clamps a holder against the now front, previously upper, face of the gate. In the fully lowered position of the gate 365, it operates limit switch 367 to open contacts 464 and effect deenergization of the relay 459 which opens to open contacts 461 and deenergize motor 361 with the device in the "dwell" position and the gate lowered for projection of a film chip in the holder.

While cam plate 353 rotates, cam plate 352 rotates therewith and its node 352A operates switch 433 to close contact 435 in series with contact 464 to provide a circuit to relay 459 and at the same time opens contact 434. Shortly after closing contact 435, it opens contact 438 to provide for contact 464 control of the energization of relay 459. The node 352A thereafter engages a node 417 on star wheel 414 to rotate it and star wheel 416 through 60 degrees to place star wheel 416 in the position shown in FIGURES 28*a* and 32 where a node 428 has moved the switching arm 459 to engage the contact 431 and disengage the contact 432. The motor 361 is deenergized by the gate opening contact 464 on limit switch 367 soon after the node 352A operates star wheel 414 and the cam plate 352 stops for projection in the position of FIGURE 29, the plate 353 being in the position of FIGURE 22. The parts have therefore completed a full operation of returning a previously viewed chip and holder back to the addressed magazine stack and have removed a selected holder from the same stack and placed it in viewing or projecting position. It will be noted that in Mode I operation power is constantly supplied to the address solenoids through the contacts 472, since the newly addressed holder will be withdrawn from the same stack to which the previously viewed holder is returned. Additional operations under Mode I will follow the identical sequence previously described so long as the selector switch 466 remains in the Mode I position and only a single and the same stack is being entered.

*Mode II operation*

In Mode II operation the magazine stacks may be addressed at random and the next holder to be selected may be taken from any of the magazine stacks without regard to the stack to which the previously viewed holder was returned. This operation requires two main changes in operation, the first being that the address bars 104 are reurned to their "zero" positions before the return of the previously viewed holder, and the second being the pause in the selector mechanism in retracted position at the previously addressed stack until new stack and holder addresses are given.

In Mode II operation the selector switch 466 is moved to the left, as viewed in FIGURE 32, thus disconnecting switch 421 and connection switch 419 to the line 456. In the lowered-gate, film projecting position in Mode II operation, the switch 419 and the star wheel 415 will be in the positions shown in FIGURES 28*b* and 32. In this position the address bars 104 are now all in their binary zero positions since both contacts 471 and 472 are open to cut off power to their address solenoids. When "go" switch 463 closed, a circuit is completed to the relay 459 through contacts 454 and 457, and the double-pole contacts 461 close to rotate the motor 361 clockwise as before. Rotation of motor 361 rotates operating member 321 and the cam plate 353 resumes its previously interrupted revolution to engage the flange 386 on bell crank 376 and rotate gate 365 upwardly into horizontal position. Contacts 464 and 465 close as soon as the gate leaves the limit switch 367 and a circuit for relay 459 is thus provided about the "go" switch 463 which may be permitted to open.

The cam plate 352 also resumes its revolution and when its node 352A engages roller 437, it actuates switch 433, opening contact 435 to deenergize motor 361 and closing contact 434 to complete a circuit to whichever of the electromagnetic operators 331, 332 has its commutator segment engaged with the brush 390A through 390J of the *previously* addressed magazine stack. The associated contact 454, 457 opens, and the associated double-pole contacts 455, 458 close to drive the motor 361 in the proper direction to rotate the selector mechanism toward the previously addressed magazine stack, as described for Mode I operation. When the insulating space 393 is opposite the brush 390 corresponding to the previously addressed magazine, the electromagnetic operator is deenergized as before to drop operating member 321 and open contacts 455, 458 to stop motor 361. Motor 361 is again reenergized through contacts 461 and operating arm 347 rotates with plate 301 stationary to rotate arms 288 and 289 to effect rectilinear movement of the selector mechanism, including the plate 235, toward the magazine to return the previously viewed holder and film chip to the bottom of the magazine stack. Upon initial rotation of arm 347, the finger 381 is moved upwardly and downwardly to elevate the holders in the stack relatively to the magazine, as described in Mode I operation. The selector mechanism returns to its retracted position as before, but without selecting and withdrawing a new holder, none being addressed since the address bars 104 are all in their binary zero positions.

Cam plate 352 rotates with the operating arm 347 and its node 352A engages a node 417 on star wheel 414 to rotate all the star wheels through another 60 degrees, thereby placing a longer node 422 on star wheel 415 in engagement with switching arm 424 to close both contacts 425 and 427. After cam plate 352 has completed a revolution, the node 352A operates switch 483 to open contact 435, thus deenergizing relay 459 and motor 361 therefrom. At the same time it closes contacts 434, but without effect, since the "zero" position input line 446 is disconnected at open contact 426. This is therefore a second "dwell" position in Mode II operation where the selector mechanism is in retracted position at the previously addressed magazine and the address bars 104 are in their binary zero positions.

The closing of contact 427 completes the circuit through light 467 which thereby signals that the device is in its second "dwell" position awaiting both a holder and a stack address to select the next to be viewed holder. Relay 468 is in parallel with light 467 so it becomes energized to close contacts 469 and 471. Closing of contact 471 supplies power to the address solenoids 111–118 so that the next holder address can be coded into the bars 104. Closing of contact 469 establishes a holding circuit for relay 468 through the normally closed contact 465 of the limit switch 367 so that the relay 468 remains energized until limit switch 367 is operated by gate 365 in its lowered, projection position. The new holder address may now be coded into the address bars 104 by manipulation of the rotary switches 105–107 to energize the appropriate solenoids 111–118.

The magazine stack in which the new holder is located is addressed by reversing the previous magazine address switch 445 and operating the switch identifying the new magazine to be addressed. That this will be a different switch is dictated by the fact that if the same magazine were desired, Mode I operation would have been selected since it is quicker and simpler than Mode II. With the closing of the new magazine selection switch 445, a new and corresponding brush 390 will be energized and one of the commutator segments 391 and 392 will thereby be connected to the power line 456. This selects and energizes an electromagnetic operator 331, 332 which closes its associated contacts 455, 458 to rotate the motor 361 in the proper direction to index the new magazine. The energized electromagnetic operator moves the operating member 321 upwardly and thereby closes switch 439, snapping switch arm 442 over the flange abutment 443, engages the clutching slots 355 with the bosses 311, and moves the latch arm 339 to unlatching position. The plate 301 now rotates to carry the selector mechanism into a position indexed with the newly addressed magazine, whereupon the electromagnetic operator is deenergized by the commutator to open the motor circuit. The motor is reenergized by relay 459 and rotates to move the selector mechanism to introduce the address bars 104 and picker bars 246 and 247 into the selected magazine, select the addressed holder and withdraw it from the stack with the retracting of the selector mechanism, as previously described.

The cam plate 352 rotates with the arm 347 and engages a node 417 on star wheel 414 to rotate it and star wheel 415 through 60 degrees to disengage switch arm 424 and close contact 426 whereby the "zero" position input line 446 is connected to supply line 456. When the node 352A thereafter engages the roller 437, switch 433 operates to open contact 435 (deenergizing relay 459 and motor 361) and to close contact 434 which energizes the appropriate electromagnetic operator 331, 332 to rotate motor 361 in reverse direction to position the selector mechanism in the "zero" position of FIGURE 21.

In the "zero" position the commutator deenergizes the electromagnetic operator to open the motor circuit, drop operating member 321 and engage latch arm 339 in "zero" position notch 302. Latch arm 339 moves strip 341 inwardly and rotates operator 342 to move the picker bar arms 254 to release the selected holder to drop downwardly onto the horizontal face of the gate 365. The relay 459 is now energized through the switch 438 and rotates the cam plates 353 and 352, the operating arm 347 being disconnected from the pin 358 by movement of the pins 361 upwardly into the slots 362 in the "zero" position. In the rotation of the cam plate 353, the flange 386 on bell crank 376 is released to permit downward rotation of the gate 365 into its vertical, projection position, the latch 369 rotating to latch the new holder against the vertical face of the gate.

As cam plate 352 rotates, node 352A first releases switch 433 back to normal position with contact 435 closed and contact 434 open. Then flange abutment 443 releases spring arm 442 to open switch 438. Next, node 352A engages a node 417 on star wheel 414 and rotates the star wheels through 60 degrees, thereby engaging a shorter node 423 on star wheel 415 with switch arm 424 to open contact 426 and close only contact 425 on switch 419. After actuating the star wheels, rotation of cam plates 352 and 353 is interrupted by the gate 365 reaching its fully lowered, projection position.

In its fully lowered position gate 365 operates limit switch 367 to open contacts 464 and 465. Opening of contact 464 deenergizes relay 459 to stop motor 361. Opening of contact 465 interrupts the holding circuit for relay 468 and contact 471 opens to cut off power to address solenoids 111–118, whereupon all the address bars 104 are placed in their binary zero positions. The parts are now in the position in which the operation description began and repeat operations may be carried out in the manner described.

*Up-dating*

The up-date switch 453 is used when it is desired to remove or insert a holder in the device and particularly to change the film chip or other intelligence means in a holder. With the switch 453 opened, when the "go" switch 463 is closed the device will operate to raise the gate 365 to its horizontal position and will then stop since the electromagnetic operators 331, 332 cannot be energized. In the horizontal position of the gate 365, the holder thereon may be removed forwardly beneath the motor 361 and above the annular supporting member 315, and a revised or substitute holder placed on the gate. Thereafter, upon closing of the switch 453 the device will resume and complete a normal operation.

*A simplified holder and stack*

FIGURE 33 illustrates a simplified version of a magazine stack for a lesser number of holders in the stack. This utilizes the same magazine 137 as previously described, but the holders 480 differ from the holders 101 in omitting the magnetic side elements 131 and 132. The holders 480 have the same front edge coding notches 102 and the side picker bar notches 133 and 134. Each holder has an individual leaf spring 481 embedded or otherwise centrally attached to the rear edge of the holder and pressing against the back wall 138 of the magazine to lightly bias the holder 480 forwardly. One side of the magazine has the same latch 144 engaging edge notches 135 at the side of the holders and the other side has the same holding or aligning element 146 whose end 147 engages the notches 136 in the opposite side edge of the holders. The holders are guided in their movements between structual pillars 482 and 483 which provide only structural support and guidance and are substituted for the magnetic side assemblies 314. In the magazine stack arrangement of FIGURE 33, the holders 480 are biased to move forwardly, after being moved rearwardly by the address bars, by means of their individual biasing springs 481 and all but the selected holder are limited in their forward positions by the engagement of the nose 147 in the notches 136. The selected or addressed holder is pulled bodily out of the stack by the picker bars, as before. This simplified arrangement does not provide for vertical repulsion by fanning out of the holders by mutual vertical repulsion therebetween and therefore has greater friction resisting movement of a selected holder relative to retained holders, particularly near the bottom of the stack where the weight of the holders is greater. This simplified arrangement of FIGURE 33 is, however, more economical than the preferred embodiment and will function adequately where lower stacks of holders are utilized in the magazine.

*The look-ahead feature*

FIGURES 34 through 37 illustrate a look-ahead feature which may be employed generally in the present invention and which is illustrated specifically in connection with the rotary selector, multiple magazine stack embodiment. Here a short gate 485 is substituted for the gate 365 of the embodiment without the look-ahead feature, which gate 485 does not rotate into a vertical position nor does it enter the optical or projection path. The gate 485 is operated by the cam plate 353 through the bell crank and linkage arrangement previously described, the gate being moved downwardly and upwardly by the cooperation of the camming edge of the plate 353 with the flange 386 but with the relative dimensions of the parts modified to coordinate with the lesser swing of the gate 385.

Referring now to FIGURES 34 through 37, a guide plate 491 having a central aperture 492 in the optical projection path is fixedly mounted, as by brackets 493, to opposite side wall supports 494. The plane of the plate 491 is disposed at right angles to the projection path and its upper end 495 is curved or inclined to receive the end of a holder sliding off the upper face of the gate 485. A pair of rotatable side plates 496 are rigidly connected by a bottom cross piece 497 having a central front cutout 498. The side plates 496 are pivotally supported at 499 on abutments 501 mounted on the supporting walls 494. The side plates 496 have arm extension 502 integral therewith and carrying at their ends pins 503 in the path of movement of the gate 485. The pins 503 are thereby engaged by the gate 485 to rotate the side plates 496 in a clockwise direction into the position shown in FIGURE 36. The forward edges of the side plates 496 are bent inwardly toward each other to form flanges 504 having shallow rear recesses 505 receiving the holders 101. The holders are biased against the flanges 504 by spring latches 506 mounted on the side plates 496 and extending through notches 507 adjacent the forward edges thereof. A curved holder edge guiding and retaining plate 508 extends downwardly from the annular support 315 just outside of the path of movement of the end of the gate 485 and has a central notch 509 in its bottom edge.

A rotary solenoid 488 is stationarily mounted and has an operating arm 511 rigidly secured to its shaft 512. The end of the arm 511 is bent transversely to provide a finger 513 extending past the central plane between the side plates 496 and carrying at the central plane a holder elevating element 514 having a retaining nose 515. The element 514 passes through the cutout 498 to engage the lower edge of a holder and in its upper position is received within both the notch 509 and a notch 510 in the upper end 495 of the guide plate 491. The element 514 may conveniently be integral with and form an upward extension from a blackout screen 517 depending from the finger 513 and movable thereby into the optical path when the arm 511 is moved upwardly. The holder elevating element 514 is normally disposed slightly below the line of movement of the bottom edge of the holders 101 and the nose 515 and inclined end 516 insure that only the previously viewed holder will be elevated, leaving the just delivered holder in position on the cross piece 497.

*The look-ahead wiring diagram*

FIGURE 32*a* shows the modifications of the wiring diagram of FIGURE 32 which are desirable to provide for inclusion of the look-ahead feature in Mode I operation. In this wiring diagram, a normally closed switch 486 has been placed in the line connecting the relay 459 to the supply line 456, with the switch 486 located on plate 301 adjacent to the selector mechanism and operated by the latch arm 399 in the "zero" position thereof. With the look-ahead feature the latch arm 339 performs three functions in the "zero" position of the selector mechanism: it enters notch 302 to latch the rotating plate 301; it moves the strip 341 to open the picker bars; and it opens switch 486. The "go" switch is changed from its position in FIGURE 32 to a position paralleling switch 486, and substituted in the parallel circuit leg for the switch 463 is a switch 487 which is a limit switch operated by the look-ahead mechanism. The limit switch 367 in FIGURE 32 is replaced in FIGURE 32*a* by a limit switch 367A positioned to be operated by the gate 485 in its lowermost position and having an additional and normally open contact 489 which is provided to connect the rotary solenoid 488 across the supply lines 452 and 456. In all other respects the wiring diagram of FIGURE 32*a* includes all of the elements and connections of the diagram of FIGURE 32.

*Operation with the look-ahead feature*

In operating without the look-ahead feature with the wiring diagram of FIGURE 32, when the selector mechanism is returned to its "zero" position, relay 459 is energized to close contacts 461 and rotate motor 361 in the clockwise direction to lower the gate 365. With the look-ahead feature and the wiring diagram of FIGURE 32*a*, upon initial indexing of the selector mechanism at its "zero" position, latch arm 339 opens switch 486, thus preventing relay 459 from being energized. The apparatus therefore stops in the "zero" position with the gate 485 in its upper horizontal position and with the newly selected "second" holder resting on the top surface of the gate, the holder having been released from the picker bars, as before, by the latch arm 339 moving the strip 341.

It is assumed that a previously selected "first" holder 101 is disposed in the viewing position transversely of the optical projection path and held against the flanges 504 by the spring latches 506. The flanges 504 are then substantially vertical, as shown in full lines in FIGURE 34, the side plates 496 being biased in a counterclockwise direction by biasing means (not shown) to also hold the holder 101 against the stationary guide plate 491.

With the selector switch 466 in Mode I position, the address of a "third" holder is placed on the address bars 104 by the proper energization of their address solenoids 111–118 through manipulation of the switches 105–107. There are three holders now affected in the operation of the device—the first in projection position; the second resting on top of the gate 485; and the third whose address has been placed on the address bars 104.

With the viewing of the first holder completed, the "go" switch 463 is closed and is held closed until the downward movement of the gate 485 is completed. Closing of switch 463 completes a circuit to the relay 459 through the contacts of switches 463 and 438 and the contacts 461 close to rotate the motor 361 in a clockwise direction to rotate cam plates 352 and 353. Cam plate 353 moves the gate 485 downwardly and the holder thereon is at an increasing angle to the horizontal, but is prevented from sliding off the gate by the guiding and retaining plate 508.

Rotation of cam plate 352 first opens contact 434 and closes contact 435 to provide a circuit to relay 459 through contacts 464 and 435. It then opens switch 438 by moving flange abutment 443 out from under spring 442. The node 352A moves the star wheels through 60 degrees and then, after about 100 degrees of rotation, is stopped by deenergization of the operating motor.

Prior to the completion of its downward movement, the gate 485 engages the pins 503 and rotates the arms 502 and the side plates 496 about the pivot 499 into the position shown in full line in FIGURE 36 and in dotted line in FIGURE 34. The first holder 101 moves with the side plates 496 into the position shown, being held against the flanges 504 by the spring latches 506. As soon as the bottom edge of the second holder on the gate 485 clears the bottom edge of the guiding and retaining plate 508, the second holder slides downwardly in front of the stationary guide plate 491 into engagement with the bottom piece 497 extending between the side plates 496. In its lowermost position gate 485 operates the limit switch 367A to open contacts 464 and 465 and close contact 489. The opening of contact 464 deenergizes the relay 459 and stops the motor 361, just as in standard Mode I operation.

The closing of contact 489 energizes the rotary solenoid 488 which now rotates the arm 511 and its transverse finger 513 from the dotted line into the full line position of FIGURE 36. As the finger 513 moves upwardly, the element 514 engages the bottom edge of the first holder and moves it upwardly relative to the flanges 504 on the side plates 496. The element 514 insures separation of the first holder from the second holder by the nose 515 and inlined end 516. When the arm 511 reaches its uppermost position, in full line in FIGURE 36, it operates limit switch 487 to close the contacts thereof. This reenergizes the relay 459 to again close contacts 461 and continue the clockwise rotation of motor 361. The cam plate 353 rotates to release the flange 386, as previously described, and gate 485 swings upwardly under its biasing means, carrying the first holder with it into a horizontal position.

As the gate 485 moves upwardly, it will, after a short distance, release limit switch 367A to close contacts 464 and 465 and open contact 489 to deenergize the rotary solenoid 488 for spring return of the arm 511 to its retracted, lower position. By the time the element 514 starts moving downwardly, the bottom edge of the first holder will be opposite the guiding and retaining plate 508 which thereby holds it on the gate 485. As the gate 485 continues its upward movement, it permits the pins 503 on arms 502 to move upwardly, thus permitting the side plates 496 to rotate counterclockwise under their biasing means. The flanges 504 and latches 506 thereby approach the vertical guide plate 491 and press the second holder thereagainst so that the holder is received in the recesses 505, the side edges of the holder passing the ends of the spring latches 506 which snap therebehind to press the holder against the flanges 504. As the arm 511 moves downwardly, the blackout screen 517 moves out of the optical path and with the second holder positioned as shown in full lines in FIGURE 34, projection of the second holder film clip is accomplished. As the arm 511 moves downwardly, the switch 487 opens but without effect since by this time contact 464 has closed to complete a circuit to the relay 459 through the contacts 435 and 463, it being understood that in the simple diagram of FIGURE 32*a*, the "go" switch 463 is maintained closed until the selector mechanism is unlatched from its "zero" position.

With the gate 485 returned to its horizontal position, the cam plates 352 and 353 continue to rotate until the node 352A opens contact 435 to deenergize relay 459 and closes contact 434 to energize one of the electromagnetic operators 331, 332. With the opening of contact 435, the "go" switch 463 may be released without effect. With the electromagnetic operator actuated, the latch 339 moves out of the "zero" position notch 302 and the switch 486 is closed to set up the circuit to relay 459 for normal operation of the selector mechanism, as previously described in Mode I operation, to return the first holder on the gate 485 back into the magazine stack being operated on and picking therefrom the newly addressed third holder. The mechanism continues to operate as in standard Mode I to return the selector mechanism back to the "zero" position where it stops with the gate 485 in its horizontal position and the third holder resting thereon, and with the second holder still in viewing or projection position. The parts are now in the position at which the description of operation began, and a new cycle can be instituted by addressing a fourth holder at the address bars 104 and closing the "go" switch 463 to initiate dropping of the third holder into viewing position, the return of the second holder back to the magazine stack, and the selection and delivery into the "zero" position of the newly addressed fourth holder.

It will be apparent that the look-ahead feature speeds up the operation to the extent of permitting viewing of or projection of the information in one holder while the apparatus is selecting, withdrawing and delivering a second holder to the "zero" position. While this look-ahead feature has been described in connection with Mode I operation, it will be understood that it may be readily adapted to Mode II operation as well, by including in the circuitry a memory of look-back to the stack from which the previous holder was selected.

*The planar mounting embodiment*

The embodiment of the invention illustrated in FIGURES 38 through 43 is directed to a multiple tier, planar mounting of the holder magazines. In this arrangement the selector mechanisms are rectilinearly movable across the front face of the store and a separate selector mechanism is provided for each level or tier of the store. This arrangement is particularly adapted to large stores and permits the mounting of the magazines in elongated walls which may be in self-sustaining structures for floor mounting. Instead of rotating to the magazine locations as in the previous embodiment, the selector mechanisms are rail mounted and guided for rectilinear movement. They are moved in opposite directions by means of endless chains passing over drive sprockets and each chain may be geared to a commutator wheel similar to the commutator wheel 308 of the rotary selector embodiment of the invention. As the description progresses, it will be apparent that the rotary selector embodiment previously described may be readily adapted to a multiple tier arrangement and also that the single level mounting of the rotary embodiment may be opened out into a planar arrangement with the selector mechanism mounted for rectilinear movement across the magazines. Such movement is conveniently effected by means of a drive chain which is movable in opposite directions to index the selector mechanism with the magazine stacks and the "zero" position in proper sequence. In the opened out, planar arrangement, a control commutator wheel similar to the wheel 308 may be driven from the sprocket of the drive chain to determine the direction and extent of movement of the chain to index the selector mechanism in its proper positions. Conversely, it will be understood that the multiple tier, planar store and operation may be readily simplified to a single level store, and all of these arrangements are contemplated within the scope of the invention.

FIGURES 38 through 43 show the multiple tier, planar mounting arrangement in generally diagrammatic fashion without entering into all of the structural details such as have been illustrated and described for previous embodiments. It is believed that with the previous detailed description, the purely design structural features of the large store arrangement should be obvious to those skilled in the art and this disclosure need not be burdened with a showing and description of such design detail. This embodiment of the invention is illustrated in a self-standing cabinet 521 in which are disposed a plurality, four as illustrated, of levels or tiers of magazine stacks 522. The stacks 522 may include magazines 137 and the items therein may be holders similar to the holders 101 previously described, having front edge coding slots 102, picker bar notches 133 and 134, and magnetic inserts 131 and 132, all as shown in FIGURE 9. Magnetic assemblies, similar to 148, 149 or 314, may be used to bias the holders to a definite position and also to magnetize inserts on the holders to provide for fanning out of the holders vertically and the lessening of the frictional resistance to the removal of a selected holder from the stack. Likewise, address bars may be utilized to cooperate with the coding slots 102 to identify a selected holder and the rectilinear operation of the selector mechanism is conveniently by means of a scissors linkage similar to that described for the single magazine embodiment and illustrated in FIGURE 1. The address bars are now mounted to have bistable positions so that they must be operated to both binary zero and binary one positions by their addressing solenoids.

In this embodiment of the invention the holders are provided with additional identifying means by which the tier or level on which they are stored is separately scanned for the return of each viewed holder to its proper level in the store.

Referring again to the drawings, supporting and guiding rails 523 are rigidly mounted across the face of the cabinet 521 in front of the magazine stacks 522 and the selector mechanisms 524 are mounted by means of rollers 525 at the top and 526 at the bottom to the lower edge of one rail and the upper edge of the next lower rail, respectively. An endless chain is mounted in a vertical plane substantially intermediate each pair of supporting rails and each chain is rigidly secured, as at 528, to the selector mechanism at its level. The chains pass individually over drive sprockets 529 at the end of their loops remote from the "zero" position for the selector mechanisms, and over similar but idler sprockets 531 adjacent the "zero" position. The sprockets 529 are each geared to an electric motor (not shown) for rotation thereby in opposite directions to move the chains 527 in opposite directions to index the selector mechanisms 524 with the magazine stacks and the "zero" position, respectively. The sprockets 529 are also geared to commutator wheels similar to the commutator wheel 308 previously described, having similar commutator segments 391 and 392 which will determine the polarity of energization of the motors and the direction of rotation of the drive sprockets 529 to move the chains and the selector mechanisms in the proper direction to index the addressed magazine stack or the "zero" position.

*The rectilinearly movable selector mechanism*

Each selector mechanism 524 is mounted in a generally U-shaped outer holder 532 having opposite legs 533 and a bight 534, with the supporting rollers 525 and 526 mounted on the outside face of the bight. On the inside face of the bight 534 are mounted a picker bar operating solenoid 535 and a mechanism operating rotary solenoid 536 carried on a bracket 537. Address bars 538 are pivoted, like the bars 104, in slots in the flanges 236 extending forwardly from the rectilinearly movable member 235 described in the previous embodiments of the invention. The member 235 in the instant embodiment is supported and moved somewhat similarly to its mounting and movement in the single stack embodiment of the invention, being mounted on the outside face of the bight 539 of a reciprocable U-shaped member 541 having legs 542. A scissors linkage is made up of pairs of links 543 and 544 pivotally connected adjacent their mid points by a pin 454 guided in slots 546 in the legs 542. The selector mechanism is biased toward the retracted position of FIGURE 40 by springs 547. The scissors links 544 are pivoted at their upper ends to the opposite legs 533 of the outer U-shaped holder 532 and at their lower ends by a pin and slot pivotal mounting to the rear edges of the legs 542 of the member 541. The scissors links 543 are pivoted at their upper ends by pin and slot connections to the upper corners of the legs 542 of the member 541, with the lower end of one link 543 rigidly connected to the shaft 549 of the rotary solenoid 536 and the lower end of the other link 543 pivotally mounted in line with the axis of the shaft 548.

An armature 549 is pivotally mounted at 551 for rotary movement toward the solenoid 535. The armature 549 has an upward extension 552 integral therewith which extends into a position to engage arms 553 to open the picker bars 246 and 247, as previously described, to release a selected holder in the "zero" position. The operation of the picker bars 246 and 247 in the gripping and withdrawal of a holder is identical with that described in the previous embodiments of the invention.

The address bars 538 select an addressed holder 101 in the same manner as described for the address bars 104. However, the construction and coding of the address bars 538 differ from the address bars 104. Each address bar 538 has an integral, transversely and upwardly extending finger 554 adjacent its upper end. A double-acting solenoid is stationarily mounted on the rear face of each rail 523, except the lowermost rail, at the "zero" position at the extreme left in FIGURE 38. These double-acting solenoids 555 have push-pull armatures 556 carrying heads 557 which are bifurcated at their lower ends at 558 to embrace the fingers 554 at and only at the "zero" position. Spring arms 559 are rigidly mounted at 561 on the uppermost flange 236 so as to be movable therewith. The spring arms 559 have nose portions 562 engageable on opposite sides by the free ends of the fingers 554 in the two stable positions of the address bars, as shown in FIGURES 42 and 43. There is one position controlling spring arm 559 for each address bar 538 and the address bars will be maintained thereby throughout the lateral shift of the selectors mechanism in the positions into which they were placed by the double-acting solenoids 555 in the "zero" position of the mechanism.

FIGURE 42 shows the push-pull armature 556 drawn inwardly to rotate the associated address bar 538 clockwise into one binary bit position. In FIGURE 43 the push-pull armature is shown operated outwardly to rotate the address bar 538 in a counterclockwise direction into its other binary bit position. In this changeover the side edge of the finger 554 has moved from one stable position to the right of the spring arm nose 562 in FIGURE 42, across the nose to its other stable position at the left of the nose in FIGURE 43. Both positions of the address bars 538 are thus stable and the address bars will remain in the positions into which they are moved in the "zero" position of the selector mechanism throughout the movements of the selector mechanism to and from the magazine stacks.

At the bottom edge of each holder 532 is mounted a rotary solenoid 563 rigidly connected to a gate 564 to rotate the gate from the horizontal position in which it is shown in FIGURES 39 and 40 into the dotted line position shown for the lowermost gate 564 in FIGURE 39. The rotary gates 564 may be wired to and controlled by a conventional pushbutton console under the control of the viewer and operator. Current to the rotary solenoids 536 and 563 and to solenoid 535 may be provided by conventional rail and brush arrangements which may be associated with the supporting rails 523 or may be independently mounted therebetween. The solenoids 535 and 536 may likewise be operated from the pushbutton console, in the simplest operating mode of this embodiment.

*The vertical holder circulation*

The vertical section of FIGURE 39 which is taken through the "zero" position of the selector mechanisms shows the circulating passages for the holders to and from the projection position. The optical system may include the lamp 214, lens system 215 and adjusting lens 216 previously described, there being shown in FIGURE 39 an optical gate at 565 and a 45 degree mirror 566 for sidewise projection of the image, as shown at 216 in FIGURE 38. The holders 101A are supported in the optical gate 565 upon a mechanical gate 567 whose position is controlled by a rotary solenoid 568 which may be pushbutton controlled. From the optical gate 565 a passage 569 leads downwardly to an endless magnetic belt 571 disposed to move vertically over a pair of pulleys 572 and 573, one of which may be driven constantly to elevate the holders for distribution to their proper levels.

As the holders 101A are moved upwardly, they pass a photoelectric scanning means represented by a light source 574 and a plurality of photocells 575 suitably connected to a control box 576 for a plurality of, as illustrated three, rotary solenoids 577, 578 and 579, the power for which is supplied from a source 581. The holders 101A may be light coded to their store levels in any one of a number of ways, the simplest being by means of holes 580 through the holders which align with the photocells 575. Small reflecting surfaces on the holders may also be used or any other coding means to identify the storage level. If three holes are used, they may be binary coded so that a least significant hole is level 1, the next significant hole is level 2 and the third hole is level 4 with level 3 indicated by the two least significant holes. The intelligence as to the level to which the holders 101A are to be sent is transmitted to and interpreted in the control box 576 and the proper outputs sent to the rotary solenoids 577, 578 and 579. The rotary solenoids 577–579 are connected to rotate deflector plates 582-584, respectively. A plurality of vertical channels 585–587 lead from the deflector plates to the lowest to the highest stack levels, in that order.

The operation of the solenoid control 576 and the rotary solenoids 577–579 position the deflector plates 582–584 so as to guide each holder 101A into the vertical passages 585–588 which leads to the level with which it is identified. Thus, if a holder level identification is for the highest level, the control 576 energizes none of the rotary solenoids 577–579 and the holder so identified is scraped off the magnetic belt 571 by the first deflector plate 582 and slides over the deflector plates 583 and 584 into the vertical passage 588 leading to the selector mechanism gate 564 at the highest level. The energization of any of the rotary solenoids will deflect the identified holder into the passageway which that deflector plate normally covers. Thus, if the identification is for the lowest level, rotary solenoid 577 is energized to raise the deflector plate, whereupon the holder is removed from the magnetic belt by the end 589 of the rear wall defining the passage 585 and the holder will travel down this passage onto the selector mechanism gate 564 at the lowest level.

When a holder is thus returned to a selector mechanism gate 564 at a given level, the address bars of that selector mechanism are all set at binary zero and the motor for the chain 527 driving that selector mechanism is energized to traverse it laterally to indexing position with the stack from which the holder was taken. The control may be either manual or from the commutator segment and address brush arrangement used in the rotary embodiment. With the selector mechanism indexed with the stack, the rotary solenoid 536 is energized to move the members 541 and 235 and the address bars 538 inwardly to move the returning holder off the gate 564 and into the bottom of the magazine stack, all as previously described in the other embodiments of the invention. Thereafter the solenoid 536 is deenergized and the selector mechanism returns to its retracted position under the bias of springs 547. Selector mechanism 524 may thereafter be returned to the "zero" position for a new setting of its address bars 538 to the address of the next holder to be selected.

The address bars are positioned by suitable energization of the double-acting solenoids 555, as by manual switching means, and upon operation of the selection switch for the stack in which the next holder is located, the selector mechanism 524 is ready to be indexed with the addressed stack in which the holder to be selected is located. The selecting and withdrawal of the addressed holder is done by reciprocating the selector mechanism, as previously described, through energization and deenergization of the rotary solenoid 536, the addressed holder being held in the picker bars 246 and 247. Thereafter the selector mechanism 524 is returned to the "zero" position where the solenoid 535 is energized to move arms 553 to release the picker bars and drop the holder onto the horizontal gate 564.

To supply the optical gate 565 there is shown in FIGURE 39 a vertical passage 591 to which lead inclined passages 592 from slightly below each magazine level. The gates 564 are rotatable by the rotary solenoid 563 in a counterclockwise direction, as viewed in FIGURE 39, to align the upper surfaces of the gates 564 with the passages 592 so that a holder will slide downwardly off a lowered gate 564 through the inclined passage 592 into the vertical passage 591 and thence into the optical gate 565, being arrested in this position by the supporting gate 567. The rotary solenoids 563 may, as previously described, be controlled manually from a pushbutton console whereby the operator can select the order of projection of a plurality of holders disposed in the "zero" position at different levels at the same time. When a solenoid 563 is deenergized after delivery of a holder off its gate 564, the gate will return to its horizontal position under the internal bias of the rotary solenoid. When the viewing or projection is completed, energization of solenoid 563, again from a manually controlled switch, will lower the previously viewed holder through the passage 569 onto the magnetic gate 571 whence it will be elevated, identified and guided into the appropriate passage 585–588 for return to the gate 564 at its identified level. The operation may then proceed as previously described.

When this embodiment is operating in Mode II, giving random access to the various magazine stacks 522, the address bars 538 will all be set to their binary zero positions before returning a holder to the stack from which it was removed. Thereafter the selector mechanism 524 will be returned to its "zero" position for encoding of the address bars 538 to the address of a new holder to be selected at that level, before the selector mechanism is indexed with the appropriately addressed new stack 522 in which the new holder is located. Thus, the address bars in Mode II operation will again be in their binary zero positions, just as in the rotary embodiment, while returning a holder to its stack but, in this planar arrangement, since the address solenoids 555 are located only in the "zero" position, the selector mechanism must return to the "zero" position to receive the new holder address before it moves to the new stack.

The operation of the multiple tier, planar arranged magazine embodiment of the invention has been followed through in the description of the structure of this embodiment and should now be readily apparent. While the specific wiring diagram has not been shown for the operating elements of this embodiment, it will be apparent that, as described, the various energizations and deenergizations to move, index, select, deliver and enfile the holders may be manually carried out in the simplest mode of operation, or may utilize a combination of manual and automatic control in more sophisticated modes. For example, the solenoid control 576 may automatically control the rotary solenoids 577–579 from the optically coded identification indicated. It has been explained how, by gearing the drive sprocket 529 to a commutator like that described for the commutator wheel 308 in the rotary embodiment, the selector mechanism may be automatically indexed with the particular stack addressed by the energization of the associated commutator brush. Likewise, the rotary solenoid 536 can be automatically energized when the selector mechanism is indexed at the addressed stack and it would be obvious to energize the solenoid 535 to open the picker bars when the selector mechanism returns to its "zero" position. Computer programming of the various operations in proper sequence may be provided for to select predetermined holders in a designated order.

While certain preferred embodiments of the invention have been specifically illustrated and described, it will be understood that the invention is not limited thereto as many variations will be apparent to those skilled in the art and the invention is to be given its broadest interpretation within the terms of the following claims.

I claim:

1. An information storage holder having a substantially flat, rectangular configuration, the front edge of said holder being provided with notches arranged in an identifying code to uniquely identify the holder by the positions of the notches; and oppositely facing substantially triangular notches in the opposite side edges of the holder immediately adjacent its front edge receiving and interlocking with gripping means for the holder for moving it in the direction of its coding notches while preventing movement transversely thereto.

2. An information storage holder having a substantially flat, rectangular configuration, the front edge of said holder being provided with notches arranged in an identifying code to uniquely identify the holder by the positions of the notches; oppositely facing, substantially trangular notches in the opposite side edges of the holder immediately adjacent the front edge receiving and interlocking with gripping means for the holder for manipulating it; and a notch in a side edge of the holder adjacent the rear edge thereof by which the holder may be locked in a supporting magazine.

3. An information storage holder having a substantially flat, rectangular configuration, the front edge of said holder being provided with notches arranged in an identifying code to uniquely identify the holder by the positions of the notches; oppositely facing, substantially triangular notches in the opposite side edges of the holder immediately adjacent the front edge receiving and interlocking with gripping means for the holder for manipulating it; and an additional notch in a side edge of the holder by which superposed holders may be restrained in vertically aligned positions.

4. An information storage holder having a substantially flat, rectangular configuration, the front edge of said holder being provided with notches arranged in an identifying code to uniquely identify the holder by the positions of the notches; oppositely facing, substantially triangular notches in the opposite side edges of the holder immediately adjacent the front edge cooperating with gripping means for the holder for moving it in the direction of its coding notches while preventing movement transversely thereto mounted on the holder at said opposite edges.

5. An information storage holder having a substantially flat, rectangular configuration, the front edge of said holder being provided with notches arranged in an identifying code to uniquely identify the holder by the positions of the notches; oppositely facing, substantially triangular notches in the opposite side edges of the holder immediately adjacent the front edge receiving and interlocking with gripping means for the holder for moving it in the direction of its coding notches while preventing movement transversely thereto; and magnetic elements mounted on the holder at said opposite edges, said magnetic elements being mounted generally on a transverse central axis of the holder and serving to effect magnetic repulsion between superposed holders to produce fanning out of a stack of holders to lessen the frictional resistance to withdrawal of a holder from the stack.

6. An information storage holder of the card type having a substantially flat, rectangular configuration, the front edge of said holder being provided with notches arranged in an identifying code uniquely identifying the holder by the positions of the notches; means at the opposite side edges of the holder and adjacent the front edge cooperating with gripping means for manipulating the holder; and spring means on said holder at the rear edge thereof for biasing it forwardly of a rear surface engaged by said spring means.

7. An information storage holder of the card type having a substantially flat, rectangular configuration, the front edge of said holder being provided with notches arranged in an identifying code uniquely identifying the holder by the positions of the notches; means at the opposite side edges of the holder and adjacent the front edge cooperating with gripping means for manipulating the holder; spring means on said holder at the rear edge thereof for biasing it forwardly of a rear surface engaged by said spring means; and a side edge notch on said holder by which it may be restrained in vertical alignment with a plurality of stacked holders.

8. A stack mounting for a plurality of superimposed information storage holders of the card type comprising: a pair of spaced side magnet structures extending throughout the height of the stack and providing magnetic air gaps adjacent the sides of the stack; and a vertical stack of holders disposed between said magnet structures are held thereby against sidewise movement, said holders having magnetic portions mounted adjacent the opposite sides thereof bridging the air gaps in said magnet structures to position and restrain said holders between said magnet structures in fore and aft directions, said magnetic portions having induced therein adjacent like poles effecting vertical magnetic repulsion between adjacent holders to lessen the frictional resistance to relative sliding movement therebetween.

9. A stack mounting for a plurality of superimposed information storage holders of the card type comprising: a pair of spaced side magnet structures extending throughout the height of the stack and providing magnetic air gaps adjacent the sides of the stack; a vertical stack of holders disposed between said magnet structures, said holders having magnetic portions mounted adjacent the opposite sides thereof to bridge the air gaps in said magnet structures, whereby said holders are positioned and restrained between said magnet structures in fore and aft directions and said magnetic portions are provided with adjacent like poles effecting vertical magnetic repulsion between adjacent holders to lessen the frictional resistance to relative sliding movement therebetween; and means for bodily lifting said stack of holders to assist the fanning out of the holders by their mutual magnetic repulsion.

10. A stack mounting for a plurality of superimposed information storage holders of the card type comprising: a pair of spaced side magnet structures extending throughout the height of the stack and providing magnetic air gaps adjacent the sides of the stack; a vertical stack of holders disposed between said magnet structures and held thereby against sidewise movement, said holders having magnetic portions mounted adjacent the opposite sides thereof bridging the air gaps in said magnet structures to position and restrain said holders between said magnet structures in fore and aft directions, said magnetic portions having induced therein adjacent like poles effecting vertical magnetic repulsion between adjacent holders to lessen the frictional resistance to relative sliding movement therebetween; side notches on said holders; and means resiliently entering said notches to restrain said holders in vertical alignment against fore and aft magnetic repulsion effects.

11. A stack mounting for a plurality of superimposed information storage holders of the card type comprising: a pair of spaced side magnet structures extending throughout the height of the stack and providing magnetic air gaps adjacent the sides of the stack; a vertical stack of holders disposed between said magnet structures and held thereby against sidewise movement, said holders having magnetic portions mounted adjacent the opposite sides thereof bridging the air gaps in said magnet structures to position and restrain said holders between said magnet structures in fore and aft directions, said magnetic portions having induced therein adjacent like poles effecting vertical magnetic repulsion between adjacent holders to lessen the frictional resistance to relative sliding movement therebetween, the front edges of said holders being provided with notches arranged in an identifying code to uniquely identify by their positions the holder in which they are located; and address means cooperating with said identifying notches to cause rearward movement of all but an addressed holder.

12. A stack mounting for a plurality of superimposed information storage holders of the card type comprising: a pair of spaced side magnet structures extending throughout the height of the stack and providing magnetic air gaps adjacent the sides of the stack; a vertical stack of holders disposed between said magnet structures, said holders having magnetic portions mounted adjacent the opposite sides thereof to bridge the air gaps in said magnet structures, whereby said holders are positioned and restrained between said magnet structures in fore and aft directions and said magnetic portions are provided with adjacent like poles effecting vertical magnetic repulsion between adjacent holders to lessen the frictional resistance to relative sliding movement therebetween, the front edges of said holders being provided with notches arranged in an identifying code to uniquely identify by their positions the holder in which they are located; address means cooperating with said identifying notches to cause rearward movement of all but an addressed holder; and means for lifting said stack of holders prior to the enfiling of a holder in the stack whereby to assist the fanning out of the holders by their mutual magnetic repulsion.

13. A stack mounting for a plurality of vertically superimposed information storage holders of the card type comprising: a pair of spaced magnet structures extending throughout the height of the stack at opposite sides therof, said magnet structures including permanent magnet elements and magnetic pole pieces extending from the poles of said magnet elements to the sides of the stack space and there disposed in separated relation to form pole faces with air gaps therebetween; a vertical stack of holders disposed between said magnet structures and held thereby against sidewise movement; and magnetic elements mounted on said holders adjacent the opposite sides thereof to bridge said air gaps, whereby said holders are positioned and restrained between said magnet structures in fore and aft directions and said magnetic elements are provided with adjacent like poles effecting vertical magnetic repulsion between adjacent holders.

14. A stack mounting for a plurality of superimposed information storage holders of the card type comprising: a pair of spaced magnet structures extending throughout the height of the stack at opposite sides thereof, said magnet structures including permanent magnet elements and magnetic pole pieces extending from the poles of said magnet elements to the sides of the stack space and there disposed in separated relation to form pole faces with air gaps therebetween; non-magnetic sheet-like material enclosing said magnet elements and pole pieces into a smooth, enclosed structure serving as a mechanical support and guide for the side edges of the holders; a vertical stack of holders disposed between said magnet structures for edgewise removal and return; and magnetic elements on said holders adjacent the opposite sides thereof and bridging said pole faces.

15. A stack mounting for a plurality of superimposed information storage holders of the card type comprising: a pair of spaced side magnet structures extending throughout the height of the stack at opposite side thereof, said magnet structures including permanent magnet elements and soft iron pole pieces extending from the poles of said magnet elements to the sides of the stack space and there disposed in separated relation to form pole faces with air gaps therebetween; non-magnetic sheet-like material enclosing said magnet elements and pole pieces into a smooth, enclosed structure serving as a mechanical support and guide for the side edges of the holders; a vertical stack of holders disposed between said magnet structures; magnetic elements on said holders adjacent the opposite edges thereof bridging said pole faces where said holders are positioned and restrained in fore and aft directions, the front edges of said holders being provided with notches arranged in binary coded numbers identifying each holder uniquely; address means engaging the front edges of said holders to move all but an addressed holder rearwardly against the magnetic aligning force whereby to select an address card from the stack; and means movable with said address means for gripping the selected holder and withdrawing it forwardly from the stack upon retraction of the address means, the other holders being prevented from moving forwardly with the selected holder by the magnetic attraction of the magnetic portions to the magnet structures.

16. In a random access storage and retrieval device, a stack of aligned card-type holders, one of the edges of said holders being provided with notches arranged in an identifying code uniquely identifying each holder by the position of the notches therein; address means positionable in accordance with said notch code to uniquely address one of the said holders; means for effecting relative movement between said stack and said address means to engage the address means with the notched edges of said holders; and means for gripping and withdrawing the selected holder as an incident to relative withdrawal movement of said address means.

17. In a random access storage and retrieval device, a stack of aligned card-type holders, one of the edges of said holders being provided with notches arranged in an identifying code uniquely identifying each holder by the position of the notches therein; address means positionable in accordance with said notch code to uniquely address one of said holders; means for moving said address means toward the edges of said holders to move all but the addressed holder rearwardly, thereby exposing and selecting the addressed holder; and means for gripping and withdrawing the selected holder from the stack as an incident to retraction of the address means.

18. In a random access storage and retrieval device, a stack of aligned card-type holders, one of the edges of said holders being provided with notches arranged in an identifying code uniquely identifying each holder by the position of the notches therein; address means positionable in accordance with said notch code to uniquely address one of said holders; means for moving said address means toward the edges of said holders to move all but the addressed holder rearwardly, thereby exposing and selecting the addressed holder; means for gripping and withdrawing the selected holder from the stack as an incident to retraction of the address means; and means for returning the stack of holders forwardly into their normal position upon retraction of the address means.

19. In a random access storage and retrieval device, a stack of aligned card-type holders, one of the edges of said holders being provided with notches arranged in an identifying code uniquely identifying each holder by the position of the notches therein; address means positionable in accordance with said notch code to uniquely address one of said holders; means for moving said address means toward the edges of said holders to move all but the addressed holder rearwardly, thereby exposing and selecting the addressed holder; means for gripping and withdrawing the selected holder from the stack as an incident to retraction of the address means; means for returning the stack of holders forwardly into their normal position upon retraction of the address means; and means for restraining the holders in the stack in their normal positions against withdrawal of adjacent holders with the selected holder.

20. In a random access storage and retrieval device, a stack of aligned card-type holders, one of the edges of said holders being provided with notches arranged in an identifying code uniquely identifying each holder by the position of the notches therein; the presence of a notch in alternate positions representing the zero and one bits of binary coding; elongated address bars located in front of the stack in substantially edgewise relation thereto and positionable in either of two positions likewise corresponding to binary zero and one bits; means for selectively moving said address bars to their alternate positions to establish a binary address for a particular desired holder; means for effecting relative movement between the stack and the address bars to engage the address bars in the notches of the addressed holder, thereby selecting the addressed holder by locating it forwardly of the remaining holders; and means for gripping and effecting forward removal of the selected holder as an incident to retraction of the address bars from the stack.

21. In a random access storage and retrieval device, a stack of aligned card-type holders, one of the edges of said holders being provided with notches arranged in an identifying code uniquely identifying each holder by the position of the notches therein, the presence of a notch in alternate positions representing zero and one bits of binary coding; elongated address bars indexable in front of the stack in substantially edgewise relation thereto and positionable in either of two positions likewise corresponding to binary zero and one bits; means for selectively moving said address bars to their alternate positions to establish a binary address for a particular desired holder; means for moving said address bars toward the stack to engage the front edges of the holders and effect rearward movement of all but the addressed holder, thereby selecting the addressed holder by locating it forwardly of the other holders in the stack; elongated latching means movable toward and away from said stack with the address bars; and means for automatically operating said latching means in the forward position of the address bars to grip a selected holder for withdrawal from the stack as an incident to retraction of the address bars.

22. In a random access storage and retrieval device, a stack of aligned card-type holders, one of the edges of said holders being provided with notches arranged in an identifying code uniquely identifying each holder by the position of the notches therein, the presence of a notch in alternate positions representing the zero and one bits of binary coding; elongated address bars indexable in front of the stack in substantially edgewise relation thereto and positionable in either of two positions likewise corresponding to binary zero and one bits; means for selectively moving said address bars to their alternate positions to establish a binary address for a particular desired holder; means for moving said address bars toward the stack to engage the front edges of the holders and effect rearward movement of all but the addressed holder, thereby selecting the addressed holder by locating it forwardly of the other holders of the stack; elongated latching means movable toward and away from said stack with the address bars; means for automatically operating said latching means in the forward position of the address bars to grip a selected holder for withdrawal from the stack as an incident to retraction of the address bars; and means for releasing said latching means operable only in the retracted position of the address bars for movement of the selected holder to a delivery position.

23. In a random access storage and retrieval device, a stack of aligned card-type holders, one of the edges of said holders being provided with notches arranged in an identifying code uniquely identifying each holder by the position of the notches therein, the presence of a notch in alternate positions representing the zero and one bits of binary coding; selector mechanism comprising elongated address bars indexable in front of the stack in substantially edgewise relation thereto and positionable in either of two positions likewise corresponding to binary zero and one bits; means for selectively moving said address bars to their alternate positions to establish a binary address for a particular desired holder; means for moving said address bars toward the stack to engage the front edges of the holders and effect rearward movement of all but the addressed holder, thereby selecting the addressed holder by locating it forwardly of the other holders of the stack; elongated latching means movable toward and away from said stack with the address bars; means for automatically operating said latching means in the forward position of the address bars to grip a selected holder for withdrawal from the stack upon retraction of the address bars; means operable in the retracted position of the address bars for operating the latching means to release a selected holder; a gate beneath the withdrawn position of a holder upon which it drops; and means for operating said gate to deliver the selected holder into an information utilizing position.

24. In a random access storage and retrieval device, a stack of aligned card-type holders, one of the edges of said holders being provided with notches arranged in an identifying code uniquely identifying each holder by the position of the notches therein, the presence of a notch in alternate positions representing the zero and one bits of binary coding; selector mechanism comprising elongated address bars indexable in front of the stack in substantially edgewise relation thereto and positionable in either of two positions likewise corresponding to binary zero and one bits; means for selectively moving said address bars to their alternate positions to establish a binary address for a particular desired holder; means for moving said address bars toward the stack to engage the front edges of the holders and effect rearward movement of all but the addressed holder, thereby selecting the addressed holder by locating it forwardly of the other holders of the stack; elongated latching means movable toward and away from said stack with the address bars; means for automatically operating said latching means in the forward position of the address bars to grip a selected holder for withdrawal from the stack upon retraction of the address bars; means operable in the retracted position of the address bars for operating the latching means to release a selected holder; a gate beneath the withdrawn position of a holder upon which it drops; means for operating said gate to deliver the selected holder into an information utilizing position; and means for opening said latching means and operating said gate automatically in proper sequence upon movement of the selector mechanism into a delivery position.

25. In a random access storage and retrieval device, a stack of aligned card-type holders, one of the edges of said holders being provided with notches arranged in an identifying code uniquely identifying each holder by the position of the notches therein, the presence of a notch in alternate positions representing the zero and one bits of binary coding; elongated address bars located in front of the stack in substantially edgewise relation thereto and positionable in either of two positions likewise corresponding to binary zero and one bits; means for selectively moving said address bars to their alternate positions to establish a binary address for a particular desired holder; means for moving said address bars toward the stack to engage the front edges of the holders and effect rearward movement of all but the addressed holder, thereby selecting the addressed holder by locating it forwardly of the other holders of the stack; elongated latching means movable toward and away from said stack with the address bars; means for automatically operating said latching means in the forward position of the address bars to grip a selected holder for withdrawal from the stack upon retraction of the address bars; means operable as an incident to the movement of the address bars into fully retracted position for releasing said latching means to drop the selected holder; a gate upon which the selected holder drops; and means for thereafter operating the gate to move the selected holder into a delivery position.

26. In a random access storage and retrieval device, a stack of aligned card-type holders, one of the edges of said holders being provided with notches arranged in an identifying code uniquely identifying each holder by the position of the notches therein, the presence of a notch in alternate positions representing the zero and one bits of binary coding; elongated address bars located in front of the stack in substantially edgewise relation thereto and positionable in either of two positions likewise corresponding to binary zero and one bits; means for selectively moving said address bars to their alternate positions to establish a binary address for a particular desired holder; means for moving said address bars toward the stack to engage the front edges of the holders and effect rearward movement of all but the addressed holder, thereby selecting the addressed holder by locating it forwardly of the other holders of the stack; elongated latching means movable toward and away from said stack with the address bars; means for automatically operating said latching means in the forward position of the address bars to grip a selected holder for withdrawal from the stack upon retraction of the address bars; means operable as an incident to the movement of the address bars into fully retracted position for releasing said latching means to drop the selected holder; a gate upon which the selected holder drops; means for thereafter operating the gate to move the selected holder into a delivery position; and latching means on said gate operating automatically with operation of the gate to clamp a holder thereon against the face thereof.

27. The random access storage and retrieval device defined in claim 12 including: a plurality of stacks of holders; means for addressing each stack individually; and means for moving said holder addressing means bodily to index it with the addressed stack in which the desired addressed holder is located.

28. The random access storage and retrieval device defined in claim 27 in which said stacks are arranged about the arc of a circle and the means for moving the holder addressing means bodily effects rotation thereof; a delivery station; and means automatically rotating the addressing means between an addressed stack wherein the addressed holder is located and a delivery position at which the selected holder is moved into an information utilizing position.

29. The random access storage and retrieval device of claim 27 in which said stacks are disposed side by side in planar relationship and said holder addressing means is bodily shifted laterally into indexed position with an addressed stack; a delivery station; and means shifting the holder addressing means and the selected holder to the delivery station for delivery of the selected holder into an information utilizing position.

30. The random access storage and retrieval device recited in claim 29 in which said stacks are arranged in side by side relation upon a plurality of levels; a holder addressing means for each level; and means at each level for bodily shifting the holder addressing means laterally on its level to index it with an addressed stack on that level in which a desired holder is located.

31. A random access storage and delivery device comprising: a plurality of vertical stacks of card-like holders arranged in side by side location, said holders being randomly located in their stacks and provided with individual identifying means thereon; selector mechanism for addressing a desired holder; means for addressing a particular stack in which a desired holder is located; means for traversing said selector mechanism into indexed position with an addressed stack; means for manipulating said selector mechanism to select and withdraw the addressed holder for the addressed stack; means for moving the selector mechanism with the selected holder therein to delivery position; and means for delivering the selected holder to an information utilizing position.

32. The device defined in claim 31 including: commutator means connected to the means for traversing said selector mechanism for determining the direction of movement of said selector mechanism in moving between its stacks indexed and delivery positions.

33. The device defined in claim 32 in which said stacks are arranged about the arc of a circle and said selector mechanism is automatically rotated into stack indexed and delivery positions in response to address commands.

34. The device claimed in claim 31 in which said stacks are arranged in planar relation and said selector mechanism is rectilinearly movable in opposite directions to and from stack indexed and delivery positions; and chain and sprocket drive means for effecting the rectilinear movement of said selector mechanism between said positions.

35. The device defined in claim 31 in which said side by side stacks are arranged at a plurality of levels; a selector mechanism for each level; means for indexing each selector mechanism with the stacks and a delivery position on its level; means for delivering selected holders to an information utilizing position; means for returning said holders to the selector mechanism at the level from which they were removed including means scanning level identifying means on the holders; and means for selecting from the level identification the proper path to return the holder to its storage level.

36. The device defined in claim 31 including: means for moving the selector mechanism and a utilized holder from the delivery position back to the stack position from which the holder was withdrawn and means for manipulating said selector mechanism to return the holder to its stack.

37. The device as defined in claim 36 in which said holders are provided with magnetic elements having mutual repulsion tending to separate the holders vertically; and means operating automatically just prior to return of a holder to its stack for lifting the holders in the stack to facilitate their fan ing out vertically for easy insertion of the withdrawn holder and for future easy withdrawal of a selected holder from the stack.

38. The device defined in claim 31 including: means for addressing, selecting and returning to a hold delivery position a second holder while a first selected holder is in information utilizing position; means for moving said second selected holder into information utilizing position on command and concurrently therewith returning the first selected holder to the hold delivery position; and means for returning said first selected holder to its storage stack and selecting a third holder and delivering it to the hold delivery position while said second selected holder is in information utilizing position.

39. The device claimed in claim 36 including: optional means for selecting a second holder from the same stack to which a first selected holder was returned and delivering the second selected holder to the delivery position, or delivering the first selected holder to its storage stack and awaiting a new stack address to which the selector mechanism is indexed to select the next desired holder.

40. The device claimed in claim 36 including: optional means for selecting a second holder from the same stack to which a first selected holder was returned and delivering the second selected holder to the delivery position, or delivering the first selected holder to its storage stack and awaiting a new stack address to which the selector mechanism is indexed to select the next desired holder, said first optional operation being accomplished by a change only in holder address after delivery of the first holder, and said second optional operation requiring readdressing of both the holder and the stack after return of the first holder to its storage stack.

References Cited by the Examiner

UNITED STATES PATENTS

| | | | |
|---|---|---|---|
| 1,704,259 | 3/1929 | Rainey | 129—16.1 |
| 2,756,931 | 7/1956 | Drillick. | |
| 2,918,656 | 12/1959 | Nolde et al. | |
| 2,940,068 | 6/1960 | Stiefel | 129—16.1 X |
| 3,073,313 | 1/1963 | Mittag | 129—16.1 |
| 3,206,269 | 9/1965 | Curtis et al. | 129—16.1 X |

EUGENE R. CAPOZIO, *Primary Examiner.*

W. GRIEB, *Assistant Examiner.*